(12) United States Patent
Brendle et al.

(10) Patent No.: US 7,536,673 B2
(45) Date of Patent: May 19, 2009

(54) APPLICATION BUSINESS OBJECT PROCESSING

(75) Inventors: Rainer Brendle, Neckargemuend (DE); Frank Brunswig, Heidelberg (DE)

(73) Assignee: SAP AG, Walldorf (DE)

(*) Notice: Subject to any disclaimer, the term of this patent is extended or adjusted under 35 U.S.C. 154(b) by 884 days.

(21) Appl. No.: 10/744,245

(22) Filed: Dec. 23, 2003

(65) Prior Publication Data

US 2005/0021354 A1 Jan. 27, 2005

Related U.S. Application Data

(60) Provisional application No. 60/489,573, filed on Jul. 22, 2003.

(51) Int. Cl.
G06F 9/44 (2006.01)
G06F 7/00 (2006.01)
G06F 3/00 (2006.01)

(52) U.S. Cl. ............... 717/102; 717/115; 707/1; 719/328

(58) Field of Classification Search ............. None
See application file for complete search history.

(56) References Cited

U.S. PATENT DOCUMENTS

| 6,865,599 | B2* | 3/2005 | Zhang | 709/218 |
|---|---|---|---|---|
| 6,922,685 | B2* | 7/2005 | Greene et al. | 707/1 |
| 7,194,733 | B2* | 3/2007 | Ringseth et al. | 717/136 |
| 2002/0065879 | A1 | 5/2002 | Ambrose et al. | |
| 2005/0005259 | A1* | 1/2005 | Avery et al. | 717/103 |

FOREIGN PATENT DOCUMENTS

| WO | WO 01/29653 A1 | 4/2001 |
|---|---|---|
| WO | WO 01/67244 A3 | 9/2001 |

OTHER PUBLICATIONS

"Sams Teach Yourself SQL in 21 Days", Safari Books Online, Appendix F. Glossary of Common SQL Commands. Online retrieved at <http://proquest.safaribooksonline.com/0672324512/app06>.*
"Remote function call", Wikipedia. Online retrieved at <http://en.wikipedia.org/wiki/Remote_function_call>.*
"TestManager Java Scalability", May 2002. Online retrieved at <www.ibm.com/developerworks/rational/library/content/RationalEdge/may02/RDNMay02.pdf>.*
"Inserting comments, timers, block markers, and synchronization points in VU scripts", Jul. 2004. Online retrieved at <www.michaeldkelly.com/pdfs/Inserting_comments_timers_block_markers_and_synchronization_points_in_in_VU_scripts.pdf>.*
International Search Report for PCT/EP2004/008113.

* cited by examiner

*Primary Examiner*—Tuan Q Dam
*Assistant Examiner*—Thuy Dao
(74) *Attorney, Agent, or Firm*—Finnegan, Henderson, Farabow, Garrett & Dunner, LLP.

(57) ABSTRACT

Methods and apparatus, including computer program products, for application business object processing. Business object processing includes receiving a script including a plurality business object operations for an application, wherein at least one of input in the script comprises a multi-dimensional data type, and initiating execution of the operations. The processing also includes determining whether a result of an executed operation is input for another operation and, if a result of an executed operation is input for another operation, using the result in the input for the other operation. The processing additionally includes returning the results of the executed operations.

39 Claims, 8 Drawing Sheets

APPLICATION BUSINESS OBJECT PROCESSING

CROSS-REFERENCE TO RELATED APPLICATIONS

This application claims the benefit of the filing date of U.S. Provisional Application No. 60/489,573 for ENTERPRISE SERVICES FRAMEWORK TECHNOLOGIES, filed Jul. 22, 2003, the disclosure of which is incorporated by reference in its entirety.

FIELD OF THE INVENTION

The invention relates to data processing by digital computer, and more particularly to application business object processing.

BACKGROUND

Large scale business software applications are sometimes categorized in terms of a "front end component" that includes a graphical user interface (GUI) to present data to users and accept data entry from users. Such front end components may be customized for specific customers. Another component of such software applications is sometimes referred to as a "back end component" that stores business data and processes the business data according to business logic. The back end component retrieves, generates, and maintains the business data. The back end component is usually responsible for the consistency and correctness of the data. The back end component also can store relationships between the various data. In a typical business software application, the front end component includes application code to display and aggregate data of the back end and provides help to generate requests to the back end for update operations.

The data of the back end can be represented using relational database terminology. In relational database terminology, an entity is a record, and an entity type is a set of entities with common attributes to which a unique name and a unique description are assigned. Typically, a database has multiple two dimensional tables where each table represents an entity type and each row in each table represents an entity. An attribute is a description of a characteristic of an entity or entity type. Typically, an attribute is specified in a field or a column in a database table. Entity types can also have relationships that enable linking one or more entities of an entity type to other entities of another entity type. This linking can be done using foreign keys by having one or more fields in one table pointing to a primary key of a second table. This enables traversing from a set of entities in one table to related entities in another table.

SUMMARY

In one aspect, a system and a method, including instructions stored on a machine-readable medium, for application business object processing are provided. The system and method include the ability to receive a script including a plurality of business object operations for an application, wherein at least one input in the script is a multi-dimensional data type. The business object operations may include creating business objects, calling methods on business objects, and releasing business objects, and the multi-dimensional data type may, for example, be a table that is self-describing in a protocol such as, for example, the Remote Function Call transport protocol. The system and method also include the ability to initiate execution of the operations, to determine whether a result of an executed operation is input for another operation, and, if a result of an executed operation is input for another operation, to use the result as input for the other operation. The business objects may, for example, exist on different machines. The results of the executed operations may be returned to the application.

In certain implementations, the system and method also include the ability to determine whether a result is relevant for an application and, if a result is not relevant for the application, to refuse to return the result. Determining whether a result is relevant for an application may include examining the script to determine whether an identifier specifies that a result is not relevant.

Particular implementations may include various options. For example, initiating execution of the operations may include deserializing the script and marshaling values. As another example, returning the results of the executed operations to the application may include serializing the results. As an additional example, the system and method may include the ability to track business object instances. The business object instances may, for example, be tracked in a running object table. As a further example, the script comprises strings in a hierarchical structure.

In certain implementations, the system and method additionally include the ability to monitor performance and resources and to create an error log if a fatal state occurs during processing.

Certain implementations include the ability to prepare a script including a plurality of business object operations, wherein at least one of the inputs for the script includes a multi-dimensional data type, and to determine whether a synchronization point has occurred. A synchronization point may, for example, be an application requesting a value that has not been returned. If a synchronization point has occurred, at least a portion of the script is prepared to be sent for processing. Preparing to send at least a portion of the script for processing may include serializing the script and marshaling parameters and values. The implementations also include the ability to determine whether processing of the script is complete and, if processing of the script is complete, update return values.

Particular implementations may include determining whether a portion of the script should be sent for processing. Determining whether a portion of a script should be sent for processing may include determining whether a portion of the script is associated with a specific processing engine. The implementations also may include sending a second portion of the script for processing after the first portion of the script has been processed if a portion of the script should be sent for processing.

In one general aspect, a system for application business object processing includes a processing engine proxy and a processing engine. The processing engine proxy is operable to interface with an application to prepare a script that includes a plurality of business object operations for the application, wherein the operations are described in Remote Function Call transport protocol and at least one of the inputs includes a self-describing, multi-dimensional data type. The proxy is also operable to determine whether a synchronization point has occurred and, if a synchronization point has occurred, determine whether at least a portion of the script should be sent to the processing engine. The proxy is additionally operable to prepare to send at least a portion of the script to the processing engine, determine whether processing of the script portion is complete, and, if processing of the script portion is complete, update return values. The processing engine is operable to receive the script portion, deserialize the operations, marshal parameters and values for the operations, and initiate execution of the operations. The processing engine is further operable to determine whether a result of an executed operation is input for another operation and, if a result of an executed operation is input for another operation, use the result as input for the other operation. The processing engine is additionally operable to determine whether a result is relevant for the application, refuse to return a result if the result is not relevant for the application, serialize the results for return, and return the results of the executed operations to the proxy.

These and other implementations may have one or more of the following features. There can be independent software lifecycles for service providers and service consumers. Services provided by a service-based software architecture can be reused for different situations. Generic engines in the software architecture can combine services for new applications. Additionally, high performance processing of business object operations at remote machines is provided while still allowing for fine granularity in interacting with back end resources and a high frequency of interaction with these resources. Moreover, the objects may appear to be exposed from the business object model.

The details of one or more implementations are set forth in the accompanying drawings and the description below. Further features will become apparent from the description, the drawings, and the claims.

DETAILED DESCRIPTION

Figure 1:
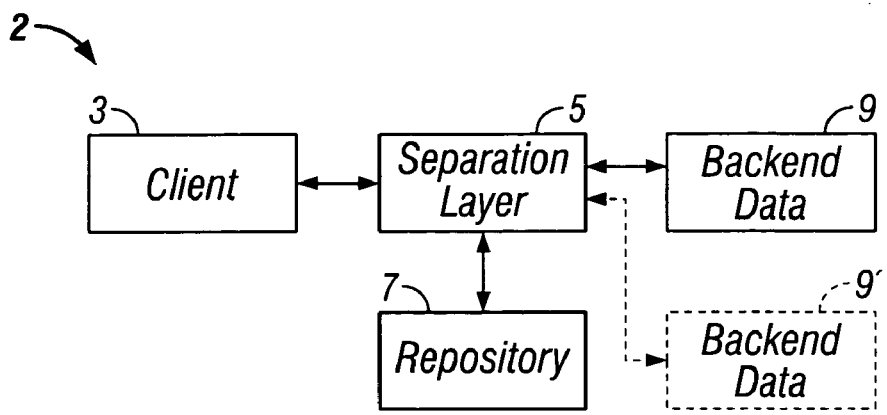
FIG. 1 is a block diagram of an example logical representation of a business software architecture.

FIG. 1 illustrates an overview logical representation of a business software architecture 2, which includes a client 3, a separation layer 5, a repository 7 and back end data 9 and 9'. Client 3 provides a user interface (UI) that enables a user to interact with the back end data 9 and/or 9'. Back end data 9 and 9' can be associated with different back end applications and/or can be arranged and formatted differently from each other. Separation layer 5 separates the front end user interface provided by client 3 from the back end data 9 and 9'. This separation enables client 3 to interact with back end data 9 and 9' in a consistent and similar manner, regardless of the formatting or application-associated differences between back end data 9 and 9'. In other words, separation layer 5 provides a canonical interface to back end data 9 and 9' so that client 3 is configured to interact with separation layer 5 and only needs to be updated if separation layer 5 changes. Changes to back end data 9 and 9' do not necessitate an update to client 3. Further, separation layer 5 is scalable and configured to handle changes and growth to back end data 9 and 9' and any other disparate back end data and back end services that are further coupled to separation layer 5. As described in more detail below, separation layer 5 is based on a meta model that defines how back end data (e.g., 9 and 9') are represented in separation layer 5. Meta data is stored in repository 7 that describes how the back end data 9 and 9' fit into the meta model representation. Client 3 interacts with back end data 9 and 9' using a generic command set defined by separation layer 5. As described in more detail below, separation layer 5 accesses service providers that perform the generic commands from client 3, using the meta data in repository 7, to effect the requested manipulation of back end data 9 and 9'. The service providers are configurable so that different service providers can be used for different back end data 9 and 9'. Separation layer 5 includes an interface (e.g., a service manager) that hides the characteristics of the corresponding back end data 9 and 9' and also the granularity and distribution of the implementation (i.e., the service providers).

Figure 2:
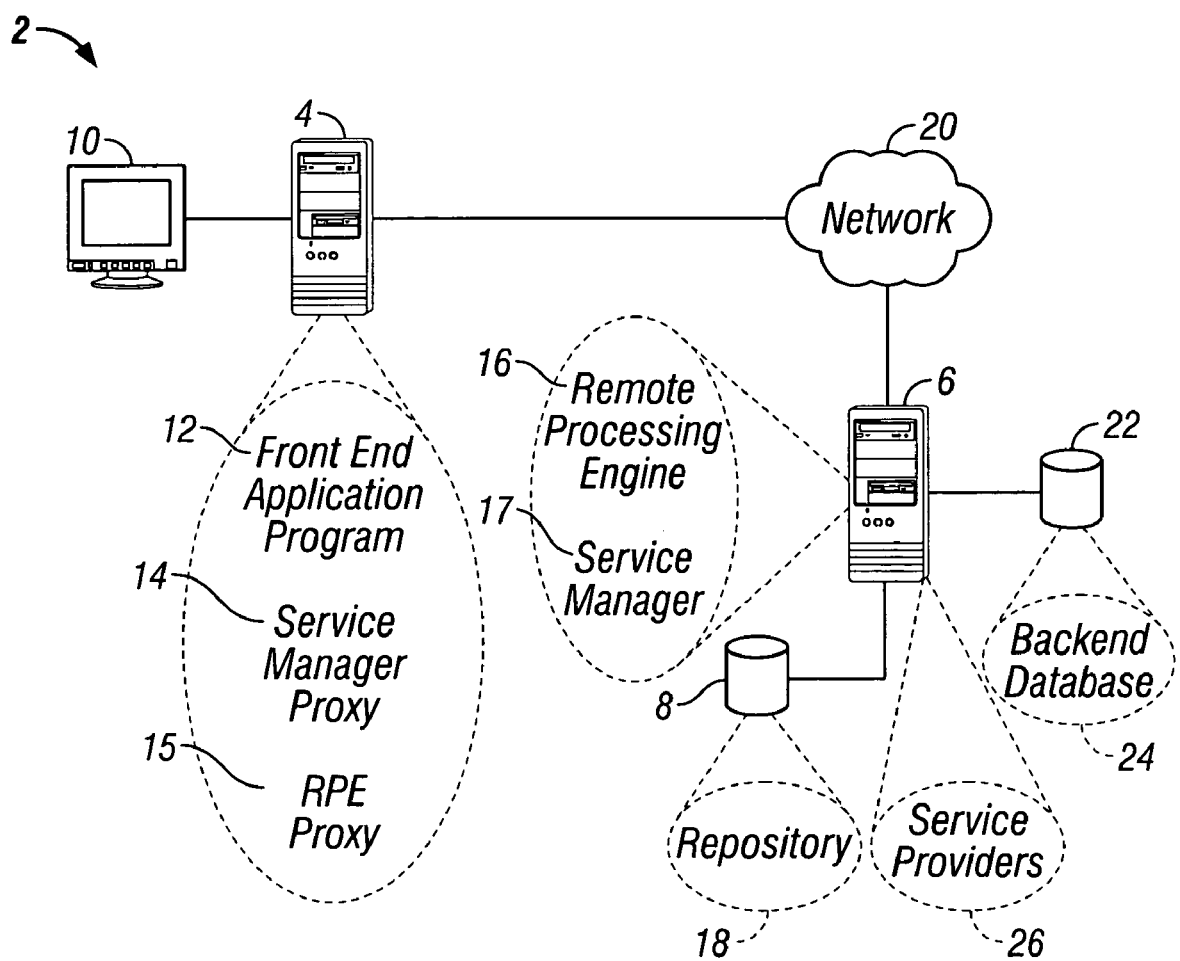
FIG. 2 is a view of a network configuration for a business software architecture.

FIG. 2 illustrates an example implementation of the business software architecture 2. As shown in FIG. 2, the business software architecture 2 includes a first computer 4 and a second computer 6. The computers 4 and 6 each can include a processor, a random access memory (RAM), a program memory (for example, a writable read-only memory (ROM) such as a flash ROM), a hard drive controller, a video controller, and an input/output (I/O) controller coupled by a processor (CPU) bus. The computers 4 and 6 can be preprogrammed, in ROM, for example, or the computers 4 and 6 can be programmed (and reprogrammed) by loading a program from another source (for example, from a floppy disk, a CD-ROM, or another computer) into a RAM for execution by the processor. The hard drive controller is coupled to a hard disk suitable for storing executable computer programs, including programs to accomplish implementations operations, and data. The I/O controller is coupled by an I/O bus to an I/O interface. The I/O interface receives and transmits data in analog or digital form over communication links (e.g., a serial link, local area network, wireless link, or parallel link). Also coupled to the I/O bus are a display and a keyboard. In other implementations, separate links (e.g., separate buses) can be used for the I/O interface, display, and keyboard.

A network 20 couples computers 4 and 6. The network 20 is any form or medium of digital data communication (e.g., a communication network). Examples of communication network 20 include a local area network ("LAN") and a wide area network ("WAN") (e.g., the Internet).

Computer 4 executes instructions of a front end application program 12. Application program 12 represents a front end component of the business software architecture 2. Service manager 17, running on computer 6, is a service layer between the front end application program 12 and a set of back end service providers 26. Service manager 17 provides a service interface to front end application program 12 to enable indirect interaction with the set of back end service providers 26 running on computer 6. This service interface allows for a partial separation of software development for front end application program 12 and the set of back end service providers 26.

Computer 6 includes a data storage device 22 that stores a back end database 24 containing data that can be used by the set of back end service providers 26. Computer 6 also includes a data storage device 8 containing an information repository 18 that defines and describes the services provided by the set of back end service providers 26. The meta data in repository 18 is organized according to a meta model.

In general, a meta model is a collection of "concepts" that are the vocabulary with which a certain domain can be described. Meta models typically are built according to a strict rule set, which in most cases is derived from entity-relationship-attribute or object-oriented modeling. The front end application program 12 can access (and interpret according to the strict rule set) the contents of repository 18 via the service manager 17. These services support the functionality of application program 12 and include retrieving and reading data in addition to modifying stored data. The service providers 26 can access or modify stored data in back end database 24 to provide services to front end application program 12. To provide the services, the set of back end service providers 26, upon request from the front end application program 12, access or modify stored data in back end database 24 or calculate new data.

The repository 18 defines a syntax for requesting services provided by the set of back end service providers 26 and semantically describes the services. As front end application program 12 executes, it can use this syntax and semantic description from the repository 18 (accessed through the service manager 17) to determine what services front end application program 12 should use to meet its requirements. This syntax and semantic description for stored or computed back end data can be referred to as "meta data". This stored or computed back end data is conceptually organized using object-oriented terminology in terms of business objects, where each business object is an instance of a class or data entity type. In one example, a class of business objects refers to a relational database table where each row of data in the table represents the data for a business object. In this example, each field in the table represents an attribute of the business object class. In another example, there is a class of business objects that partially refers to a relational database table such that some of the fields in the table represent attributes of the business object class and other fields are computed upon request.

In the business software architecture 2, services provided to front end application program 12 are focused on data (i.e., data-centric) so the description of these services in repository 18 is also data-centric. Thus, the meta data in repository 18 is structured around representations of classes of these business objects. This meta data includes aspects, or descriptions of these representations of business object classes, and descriptions of available operations on aspects such as select, insert, update, delete, select by relation, and update fields that are provided by service providers 26. Each description of these aspects includes data attributes as well as actions that can be requested to be executed by the set of back end service providers 26 on instances of these aspects.

Classifications of data, relations between data classes, pre-built queries for accessing data, and other descriptions of data provided by the set of back end service providers 26 are represented by repository 18. This representation, or meta data, of data (e.g., stored in back end database 24) provided by the set of back end service providers 26 describes different abstract types or classes of data in back end database 24 and how different data classes relate to each other. Objects are instances of these different abstract types. Meta data is information about data rather than content of the data. The meta data also defines a set of pre-built queries that can be executed on the data in database 24.

The semantic description in repository 18 can enable front end application program 12 to determine which services to request from service manager 17. These services often take the form of requesting data to display. Front end application program 12 reads the meta data in repository 18 and can flexibly request data organized in different ways that are specified by the meta data. For example, two service managers 17 with two different repositories 18 handle services that determine prices of books for companies A and B. For A and B, book prices are represented by different aspects with different data fields. Front end application program 12 reads A's repository 18 to obtain descriptions of data (including a price) concerning a particular book from A's service providers 26. Front end application program 12 reads B's repository 18 to obtain descriptions of data (including a price) concerning a particular book from B's service providers 26. Front end application program 12 is able to request and display the information from A's service provider 26 and the information organized differently from B's service provider 26 to present the book price information to a user.

For requesting the services described by the semantic description in repository 18, service manager 17 provides a canonical interface for services on the business objects in the back end. This canonical interface includes a set of standard operations on the business objects. Such standard operations on the business objects include select, insert, update, delete, select by relation, and update fields. These standard operations are intended to be easy to understand and use. The usage of these standard operations is understood through the strict rule set of the meta model of the repository 18. Furthermore, the repository 18 also includes documented modeling of the side effects of the usage of the operations. The side effects for an operation model which stored business objects are affected by executing the method. For example, "delete" usually has an effect on specific stored business objects. Other standard methods are more specialized and support functionality for transactions between front end application program 12 and service manager 17.

The canonical interface provided by the service manager 17 also includes specialized actions that are defined for specific classes of business objects and queries that can be defined for clusters of classes of business objects. The clusters are modeled as service modules (described in more detail below) in the meta data. These actions and queries are also defined in the meta data of the repository 18.

During execution, front end application program 12 issues service requests to service manager 17, service manager 17 checks the requests for consistency with the meta data in repository 18, and then the service manager 17 passes the requests to back end service providers 26 according to the meta data in the repository database 18. The manner of implementing the set of back end service providers 26 and data in database 24 is independent of application 12, with back end service providers 26 and data in database 24 conforming to the definitions and descriptions of the meta data in the repository 18. Database 24 can be a relational database. However, database 24 can be modified to use a different mode of data organization other than a relational database and front end application program 12 does not need to be modified if back end service providers 26 and data in database 24 still conform to the meta data in the repository 18. One such different mode of data organization for database 24 can be an object-oriented database.

Front end application program 12 provides user interfaces displayed on monitor 10. Front end application program 12 provides application code to display and aggregate the data of the set of back end service providers 26. Front end application program 12 generates requests, via service manager 17, to the set of back end service providers 26 for standard operations such as select, insert, update, delete, and execute in addition to more specialized operations. Front end application program 12 is interaction-centric, focused on aggregating data of the back end service providers 26 and combining interactive steps into a flow of screens and syndicated screen elements.

Front end application program 12 contains screen-flow logic of User Interface (UI) oriented applications, and front end application program 12 binds a UI to the meta data in repository 18. Front end application program 12 can be indirectly bound to a specific set of back end services by back end service providers 26 via descriptions of the services in the meta data of the repository 18. Front end application program 12 can also be formed from various generic interaction-centric front-end layers that are only bound by configuration to a highly standardized service layer by service manager 17 serving as an intermediary to back end service providers 26.

In certain implementations, the front end application program 12 is not restricted to a program having a (graphical) user interface. Generally any application can use services provided by the set of backend service providers 26. Example applications include a batch process that modifies or analyzes data. For instance, the front end application program 12 can be an application that automatically calculates proposals for paying incoming invoices may be based on the same encapsulation of business logic as an UI for manually maintaining payment information.

In some implementations, a service manager proxy 14 gives the front end application program 12 a buffered access to a service interface provided by service manager 17. Service manager proxy 14 is a server on computer 4 that acts as an intermediary between the front end application program 12 and the service manager 17 so that the business software architecture 2 can ensure security, administrative control, and caching service. The service manager 17 may offer a queuing functionality that is used by the front end application program 12 to bundle several service requests or commands (resulting in service methods) into a single service method queue in order to save round trips. Service manager proxy 14 allows front end application program 12 and service manager 17 to be separated onto different computers 4, 6. Furthermore, this can allow service manager 17 and the set of back end service providers 26 to be distributed over multiple computers.

In certain implementations, architecture 2 also includes a remote processing engine (RPE) 16 and an RPE proxy 15. The RPE framework (i.e., RPE Proxy 15 and RPE 16) is responsible for, as far as possible, hiding the issues of communication between objects (e.g., Advanced Business Application Programming (ABAP) objects) in a distributed environment and providing well-known object-oriented operations like "create object," "set property," and "call method." Thus, the RPE framework provides services to use objects in an object-oriented way, but in which potentially every object may live on a different machine. Moreover, the RPE framework allows a remote client application (e.g., application program 12) to communicate with back end objects (e.g., database 24) in a fine granular, yet performance-capable manner. Furthermore, the RPE framework may serve as an abstraction layer of the different object software environments for multiple vendors.

In particular, RPE 16 may allow for the instantiation and release of objects, calling methods on objects, and setting or getting property values. During these operations, a proxy (e.g., RPE proxy 15) is used; thus, a user will not know whether the objects live in the local environment or in a remote environment. Once processing is finished, the program should be informed to synchronize the object model with corresponding counterparts.

The general concept for communication between application program 12 and RPE 16 is that the program collects method calls and sends a group of method calls for RPE 16. To accomplish this, RPE proxy 15 may act as an API between the program and the RPE. RPE proxy 15 is responsible for providing an object-based interface for the required object classes and for handling the collection and serialization of the method calls. Then, at dedicated synchronization points, an automation queue, or script, containing the method calls, parameters, and values is sent to computer 6, where RPE 16 is running. Upon receiving the queue, RPE 16 executes the script. In executing the script, RPE 16 uses return value processing; that is, the return values from a method call (e.g., elementary types, structures, tables, and objects) may be used as parameters on any other object. This avoids a roundtrip to the client-side application. Once RPE 16 is finished processing, it sends the return values back to the application program 12. In certain implementations, however, RPE 16 may have certain return values declared as not relevant, so that they are not returned to the application program. After the synchronization request has been processed, the return values are available in the program.

The RPE framework has several features. For example, in a distributed environment, a framework that allows for fine granularity in interacting with back end resources (e.g., instantiating objects and calling methods on these objects) and allows a high frequency of interaction with these resources may have performance issues, especially if the resources live on different machines that are coupled by a WAN. RPE 16, however, addresses this by allowing for the queue processing of service methods at remote machines. Thus, redundant roundtrips may be avoided. Moreover, the objects may appear to be exposed from the business object model. As another example, communication between objects over network boundaries by using a declarative protocol reduces the flexibility of such a framework. RPE 16, however, allows objects to communicate in a fine granular manner, allowing more flexibility. Moreover, the communication may use an undeclared protocol. As an additional example, many approaches use the technique of state transmission, which may result in large data packets or in highly sophisticated delta mechanisms based on semantics of the objects. But RPE 16 may track the state of business objects and, hence, avoid state transmission.

To further reduce bandwidth, values may be described as temporary values, meaning that these values will be used only in the processing operations of the automation queue. In particular, large return tables that will be used in the method calls, but that are not relevant for the application program or user, will not be transported to the application program.

The RPE may also provide back end-back end distributed objects communication. For example, consider an application module, such as Customer Relationship Management (CRM) module, that has to use a data module, such as a Master Data Management (MDM) module. The application module may be the client of the data module. While both modules can run in the same system, the two modules can also run in distributed environments on different machines with different databases. Furthermore, the application module may be implemented in Java, and the data module may be implemented in ABAP. These distinctions, however, may be hidden by the application module using the data module via the RPE mechanism. That is, the application module does not see anything about the environment or topology of the data module.

In certain implementations, back end helper objects or helper services may also be used to reduce roundtrips. These objects/services allow some functionality that would otherwise cause a roundtrip to be processed on the computer 6. For example, in some situations, there is the task of copying the content of some fields of a table to fields with the same name in another table (e.g., "move-corresponding" in ABAP). A helper object can provide this functionality with a special method that executes the move on the computer 6, and, therefore, avoids the roundtrip. Other examples of functions that may be performed by helper objects are clearing the content of a table, copying a subset of a table to another table, and removing records from a table.

The features of the RPE framework may be important in Internet scenarios, especially those where the connectivity to business objects is based on Web Services, or similar infrastructure that use a connectionless transport protocol like HyperText Transport Protocol (HTTP). In such scenarios, it is problematic for a business system to hand out system resources like transactions or locks to the caller client, because the Web Services will typically be overloaded with parameters and data to get all possible functionality of the business system. To avoid the loading problems, however, a coarse functionality may be used. But this means that the business system functionality cannot be provided the client application in an adequate business object model with an understandable fine granularity.

Figure 3:
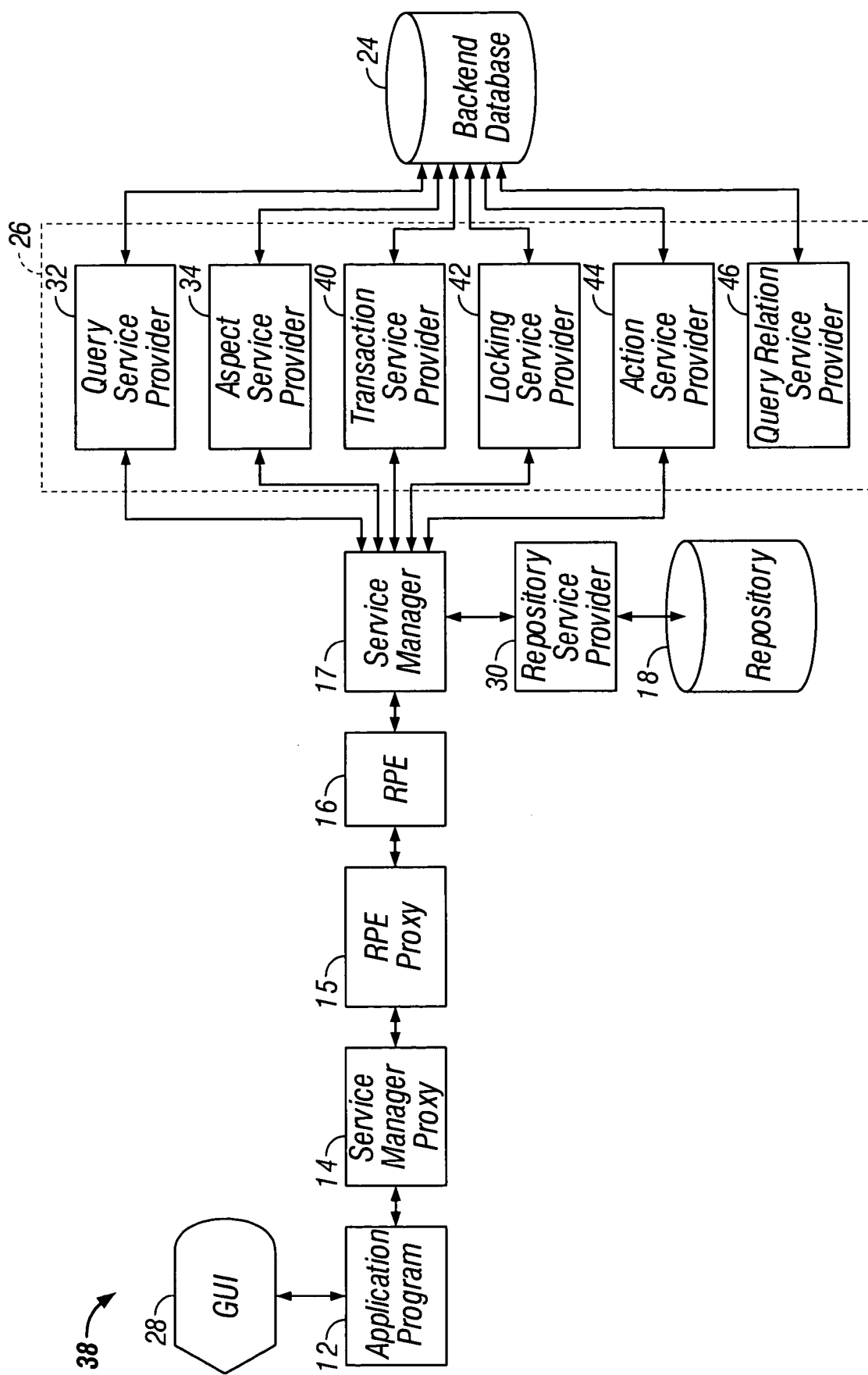
FIG. 3 is a block diagram of the business software architecture of FIG. 1.

As shown in FIG. 3, the service manager 17 provides an interface (defined by the metadata in repository 18) to front end application program 12 that hides the characteristics of the corresponding back end service providers from the set of back end service providers 26 and data in database 24. Front end application 12 uses this interface to display data in graphical user interface (GUI) 28 for interaction with a user. In other cases, front end application 12 uses this interface to automatically calculate data.

The service manager 17 provides the interface to front end application program 12 by receiving and executing requests from front end application program 12 to back end service providers 26, the requests possibly being bundled in a queue and dispersed by RPE 16. After each receipt of a request by the service manager 17, the service manager 17 delegates the request to one or more service providers 30, 32, 34, 40, 42, 44, and 46. Service provider 30 is an instance of a software class repository service provider. Service providers 32, 34, 40, 42, 44, and 46 represent instances of software classes such as query service provider class (32), aspect service provider class (34), transaction service provider class (40), locking service provider class (42), action service provider class (44), and query relation service provider class (46). The software classes for service providers 32, 34, 40, 42, 44, and 46 can be implemented as ABAP global classes maintained by the ABAP class library using the ABAP development environment available from SAP AG of Walldorf, Germany. They also can be implemented by any other programming language on any other platform (e.g., Java on Linux or C# on Windows).

Repository service provider 30 handles requests to get or modify meta data from repository 18. Query service provider 32 handles queries on data in back end database 24 from front end application program 12. Aspect service provider 34 handles accessing and modifying data, navigation through relations and calling actions. The aspect service provider 34 has a standard set of methods that correspond to the standard operations on aspects that can be requested from the service manager 17. These standard operations include select, insert, update, delete, select by relation, and update fields. Transaction service provider 40 allows business logic to act on different states of a transaction between front end application program 12 and service providers. Locking service provider 42 enables separation of concurrent accesses on data types in back end database 24. Action service provider 44 enables execution of actions on aspects. Query relation service provider 46 is the interface for the target aspect of a relation. In some examples, service manager 17 can have different multiple instances of service providers 32, 34, 40, 42, 44, and 46 for different elements in repository 18 representing services. Upon receiving a request for a service represented by an element in repository 18, the service manager 17 can look up a name of a service provider (e.g., 32, 34, 40, 42, 44, and 46) in the meta data for the element in repository 18. For example, the meta data describing an aspect in repository 18 defines which aspect service provider 34 is designed to handle services for the aspect. The service manager 17 uses this information in the meta data to direct requests from the front end application program 12 to the appropriate aspect service provider 34. Similarly, the meta data describing a query in repository 18 defines which query service provider 32 is designed to handle services for the query.

In one example, the service manager proxy 14 communicates with service manager 17 using SOAP (Simple Object Access Protocol) messages via network 20. SOAP is a way for a program running in one kind of operating system (such as a Windows® XP Operating system available from Microsoft Corporation of Redmond, Wash.) to communicate with a program in the same or another kind of an operating system (such as Linux) by using the World Wide Web's Hypertext Transfer Protocol (HTTP) and Extensible Markup Language (XML) as mechanisms for information exchange. Since Web protocols are installed and available for use by all major operating system platforms, HTTP and XML provide a solution to a problem of how programs running under different operating systems in a network can communicate with each other. SOAP specifies exactly how to encode an HTTP header and an XML file so that a program in one computer can call and pass information to a program in another computer. SOAP also specifies how the called program can return a response.

The interface provided by the service manager 17 provides requests or commands to front end application program 12. As mentioned previously, standard commands select, insert, update, delete, select by relation, and update fields are standard operations on aspects in the repository 18. These standard operations are provided by aspect service provider 34 and correspond to some of the requests or commands available to front end application program 12. A "Select" command provides a capability such that if the identifiers (or keys) of instances of a data type (possibly stored in database 24) provided by aspect service provider 34 are known, front end application program 12 can select and read the attributes of these instances. An "Insert" command allows front end application program 12 to add new instances of a data type (possibly stored in database 24) provided by aspect service provider 34. A "Select By Relation" command provides a capability that if a data type is known, front end application program 12 can find other data types that have relations to this data type as defined in repository 18. An "Update" command provides a capability to modify instances of data types (possibly stored in back end database 24) provided by aspect service provider 34. A "Delete" command provides the capability to delete one or more selected instances of one or more data types (possibly stored in back end database 24) provided by aspect service provider 34.

An "Execute" action command provides a capability to execute a semantically defined action on one or more instances of one or more data types (possibly stored in database 24) provided by aspect service provider 34. Either the aspect service provider 34 or the action service provider 44 executes the Execute action command.

A "Query" command provides a capability to search and find particular data of interest. The Query command is a method with a fixed set of search parameters and a result set with a defined structure. Queries are defined for particular service modules, or clusters of aspects in the meta data of the repository 18. The query service provider 32 executes a Query command.

Figure 4:
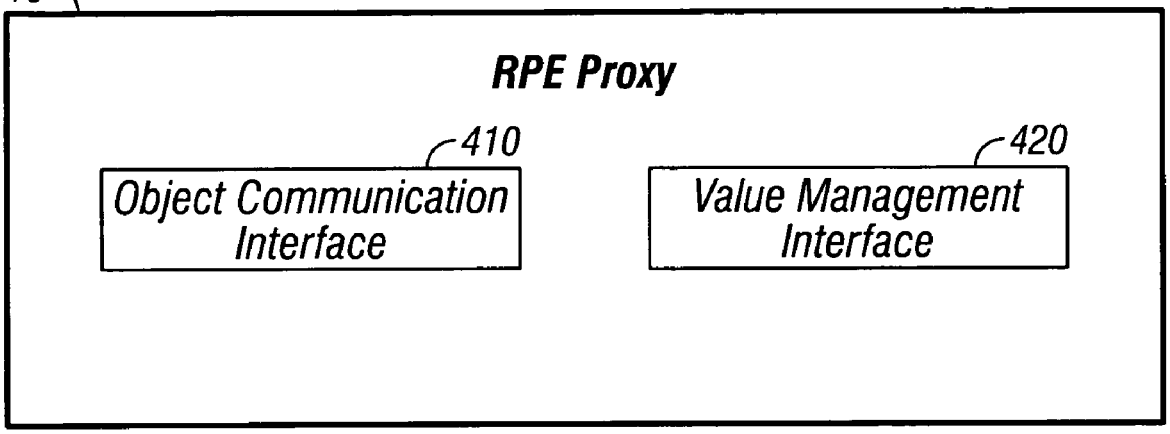
FIG. 4 is a block diagram of an example remote processing engine proxy for the architecture in FIG. 3.

As discussed previously, RPE 16, along with RPE proxy 15, provide the ability to create, delete, and manipulate objects in a queued manner. FIG. 4 illustrates one example of RPE proxy 15. In this implementation, RPE proxy 15 has an object communication interface 410 and a value management interface 420. Object communication interface 410 provides methods for: 1) establishing, flushing, and closing communication channels; 2) creating and releasing objects; 3) calling methods, setting properties, and getting properties; 4) subscribing and publishing events; and 5) error handling and monitoring. Value management interface 420 provides methods for: 1) creating and releasing parameters and values, including elementary types, structures, and objects; 2) setting and getting value data; and 3) marshaling data. These functions will be discussed in more detail below in conjunction with the interoperation between RPE proxy 15 and RPE 16. The RPE proxy may be implemented in Java or any other appropriate language, such as ABAP or NET.

Figure 5:
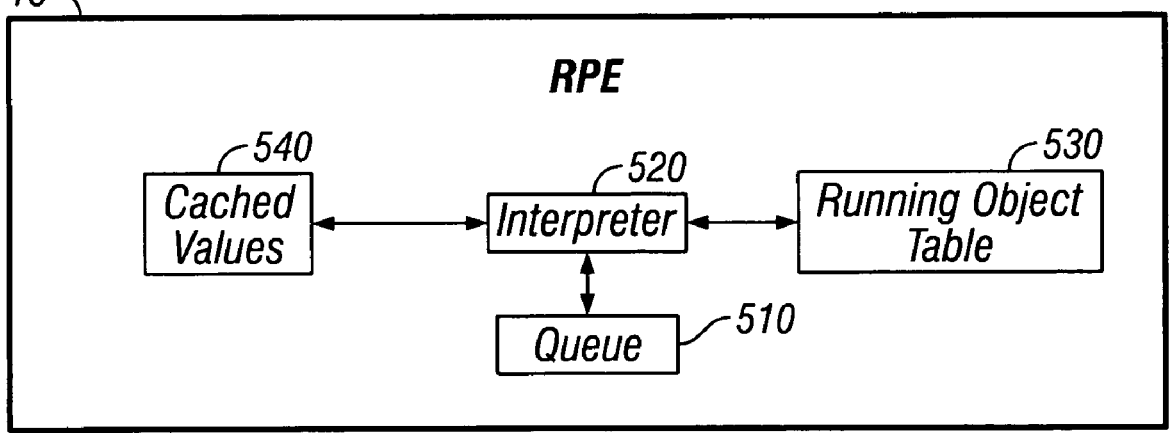
FIG. 5 is a block diagram of an example remote processing engine for the architecture in FIG. 3.

FIG. 5 illustrates one example of RPE 16. In this implementation, RPE 16 includes a queue storage area 510, an interpreter 520, and a running object table (ROT) 530. Queue storage area 510 stores the queue from RPE proxy 15. Interpreter 520 is responsible for reading the queue and determining the appropriate processing. Running object table 530 stores a current list of the active objects. The functions of the interpreter 520 and the running object table 530 are explained in more detail below. The RPE 16 may be implemented in ABAP or any other appropriate language, such as Java or NET.

The communication of the object operations between RPE proxy 15 and RPE 16 may be in any appropriate protocol and format. For example, RPE proxy 15 and RPE 16 may communication use Remote Function Calls (RFC) and/or Web Service as the transport protocol. These protocols may support authentication and authorization. As another example, the communication format may use tables.

For instance, the external connectivity interface may be based on three importing tables and two exporting tables. The three importing tables may describe the processing lines, the parameters, and the values. The distinction between parameters and values may be necessary for systems that support named parameters; the same values may be used in different parameters with different names. The two exporting tables may describe the return values and the error log containing exception descriptions.

An example function call to the RPE 16 is declared as follows:

| RSE_EXECUTE | importing | LINES | type | RSE_LINES_TAB |
| | | PARAMS | type | RSE_PARAMS_TAB |
| | | VALUES | type | RSE_VALUES_TAB |
| | exporting | RETURNS | type | RSE_RETURNS_TAB |
| | | ERRORS | type | RSE_ERRORS_TAB |

The importing and exporting importing tables are declared as parameters and represented as strings (XML), so that the interface may also be provided as a Web service. Also, the fields of the transport tables are defined as Xstrings, which is a string containing UTF8 encoded data. Using strings for the content protocol allows the data exchange to be hardware and localization independent.

The RSE_LINES_TAB parameter is a table of RSE_LINE structures. The RSE_LINE structure describes one script line. Table 1 illustrates the structure.

TABLE 1

RSE_LINE Structure

| Field | Type | Description |
|---|---|---|
| OBJECT | String | The reference key of the object |
| OPCODE | String | The operation code for the engine like 'C', 'M' etc. |
| METHOD | String | The method name |
| BEG_IMP_PARMS | String | The index of the importing parameters in the PARAMS table |
| CNT_IMP_PARMS | String | The number of importing parameters |
| BEG_OUT_PARMS | String | The index of the exporting parameters in the PARAMS table |
| CNT_OUT_PARMS | String | The number of exporting parameters |

The object reference key may be assigned by the client program at creation time. To instantiate a new object of a class, the client application establishes a script line with the opcode='C' (create) and two parameters. The first parameter describes the assigned reference key for this new object. The second parameter describes the class. In further method calls to this object instance, the object field contains this assigned reference key. To process a method call, the opcode contains the technical semantic 'M' (call method), 'S' (set property), or 'G' (get property) of the call. The opcode 'R' (release object) causes the engine to release the object.

The RSE_PARMS_TAB parameter is a table of RSE_PARM structures. The RSE_PARM structure describes one parameter in one specific method call. Table 2

TABLE 2

RSE_PARM Structure

| Field | Type | Description |
|---|---|---|
| NAME | String | The name of the parameter |
| TYPE | String | The type of the parameter in the destination system |
| VALUE | String | The index of the value in the VALUES table |
| META | String | The meta information for the value manager |

In the destination system, the parameter of a method call may be described by its name. In environments that do not support named parameters, the name of the parameter may be '#position.' In these cases 'position' is a identifier (e.g., an integer) that describes the position of the parameter in the method call. The type field contains the type of the parameter in the destination system, which is in most environments part of the calling interface. The value field is the index in the VALUES table, and the meta field contains information about the inherent structure of the parameter. The inherent structure of a parameter may be 'A' (atomic, for simple data types like strings or integers), 'S' (flat or deep structure), 'T' (table), and/or 'O' (object). Among other things, the meta field information is relevant for the value manager to provide an adequate value access interface for the server processing engine and the client applications.

In certain implementations, the kind of parameter is specified. Parameters may be importing (e.g., input parameters, which may not modified by the method), exporting (e.g., output parameters, which may be initialized by a method), changing (e.g., parameters used for input and output, which may be initialized by a client and modified by a method), and/or return (e.g., output parameters). Parameter kinds may be created using string method calls from string representations of parameter kinds.

The RSE_VALUES_TAB parameter is a table of RSE_VALUE structures. The RSE_VALUE structure contains the data of a value as an Xstring. Table 3 illustrates the structure.

TABLE 3

RSE_VALUE Structure

| Field | Type | Description |
| --- | --- | --- |
| VALUE | Xstring | The data of the value |

The RSE_RETURNS_TAB parameter is a table of RSE_RETURN structures. The RSE_RETURN structure describes the index of the return value in the RSE_VALUES_TAB and contains the data of the value as an Xstring. Table 4 illustrates the structure.

TABLE 4

RSE_RETURN Structure

| Field | Type | Description |
| --- | --- | --- |
| VINDX | String | The index of the return value in the RSE_VALUES_TAB |
| VALUE | XString | The data of the return value |

The RSE_ERRORS_TAB parameter is a table of RSE_ERROR structures. The RSE_ERROR structure describes the exception that happened in one script line during execution. Table 5 illustrates the structure.

TABLE 5

RSE_ERROR Structure

| Field | Type | Description |
| --- | --- | --- |
| CATEGORY | String | The error category |
| LINE | String | The index of the script line |
| CLASS | String | The class name of the object that causes the exception |
| PARAM | String | The index of the parameter that causes the exception |
| VALUE | String | The index of the value that causes the exception |
| CODE | String | The exception code |
| STATE | String | The state of the processing engine (fatal, recovered) |
| DESCRIPTION | XString | The description of the exception |

Depending on the exception, the processing engine may process further processing lines. Thus, the error table can contain multiple records. The line field is the index of the script line in the LINES table. If the exception is related to an assignment of a parameter, the PARAM field contains the index of the fault parameter in the PARAMS table. If the exception is related to the marshalling of a value, the VALUE field contains the index of the fault value in the VALUES table. The exception code is described in the exception field and depends on the ABAP object class.

The state field describes the internal state of the processing engine (e.g., the state 'FATAL' means that the engine is not able for further processing). The description is a human readable description of the exception, which may be used in a system log or tracing service.

In operation, one task of the RPE proxy 15 is to establish a communication channel. Establishing a channel may include specifying a system locator (e.g., URL), a client name, a user name, a password, a language, and a single-sign-on (SSO) key. The channel may be implemented using Java Connector for SAP (JCO). The RPE proxy may then manage the channel. The startup and shutdown of the application program may be the task of the channel. Once the channel is created, calls to create an object may attach an instance of an object to a certain location.

The channel may provide the services for communication with a business system. If the RPE proxy maintains contexts and channels as strictly separated, it may be possible for a context to manage several channels in parallel or in sequence. This may be important, for example, if the infrastructure is to be used in an integration platform. In certain implementations, however, contexts may share channels and business objects, although they may maintain separate instruction queues and error logs.

After establishing the channel, the application program, in conjunction with RPE proxy 15, may prepare the script to create objects, call methods, release objects, and so on using value management interface 420 for creating and handling parameters and values. This is a deferred processing step, because return values are not valid at this time. RPE proxy 15 may provide the queuing mechanism for method calls, including return value processing, in an almost transparent manner from the application program standpoint.

At a synchronization point defined by the application program 12, possibly at the direction of a user, RPE proxy 15 is responsible for sending the script to computer 6, so that it may be processed by RPE 16. An example of a synchronization point is when the application program requests a value that has not been returned yet, meaning that the request invalid. The value may be a return value or an exporting value. The RPE proxy may then send the appropriate calls to make the value valid. Method calls with no parameters or only importing parameters, however, may be queued until a flush method (e.g., one that submits all queued instructions to the RPE) of the context is called. If there is a synchronization of the method queue, maybe due to a method call with a return value, the previous queued calls may also be processed. The sequence of the method calls may be unchanged. Another example of a synchronization point is the receipt of a method call. Thus, the method calls may be processed immediately, which may be useful for diagnostic applications. This allows specifying the flush behavior on the level of the method call itself. An additional example of a synchronization point is when a specific method call is received. The network request may be performed synchronously or asynchronously. In a single channel scenario, the synchronization mechanism may send the method queue to the business system in a synchronous way.

Helper objects may also be used. For instance, in some implementations, there are data aspects and key aspects, the key aspects being a sub-structure of the data aspects. If the user is working on a hollow aspect that is not synchronized with the back end, the data of the aspect is not available. And, thus, if the user wants to get the key aspect because he wants to follow a relation on the key aspect, this would typically imply a flush on the RPE context to get the values of the key aspect. But the data of the key aspect is little else than a "move-corresponding" of the key fields of the data aspects to the key aspect. Accordingly, introducing a helper object that provides a method like "move-corresponding" allows a roundtrip to be avoided. If the data of the data aspect is available on the client, the keys of the data aspect can be copied to the key aspect. If, on the other hand, the data of the data aspect is not available on the client, a method call "move-corresponding" is made on the helper object. This call is not processed immediately, but, instead, is added to the method queue. After that, the user can follow the relation on the key aspect without a roundtrip, because this call will also be added to the method queue.

When a method flush is called on an RPE context, possibly by a user of the framework, the RPE context, which is the cover around the channels, manages the method queue. Within the flush method, the context serializes the method queue, marshals data, and sends the appropriate parts of the queue to the back end systems.

Serialization involves putting data in a transportable format. In particular implementations, it may be the task of the RPE context to transport data and proxy object-object-relationships via a stream protocol over the network from one machine to another machine. It may be difficult, however, to transparently transport data, and, in particular, object references, via a network using a streaming protocol without some serialization mechanism. An object reference may be serialized, for instance, by using a name reference. Every object reference, therefore, may also be identified by a unique name, which may be transported as string over the network.

Marshaling involves dealing with data types mapping between different environments. For example, different software environments, like Java and ABAP, may have to be linked with different data types, which are similar but not identical. A date in Java and in ABAP, for example, are similar.

The real objects exist in the back end systems, and, therefore, these objects are the counterparts of the proxy objects on the RPE proxy 15. After processing a part of the queue, the context updates the return values and sends the next part of the queue to the next back end system until the method queue is processed. Thus, the front end/client proxy object model is synchronized with the actual object model. It is possible, however, that within a method queue with different back end systems, one back end system can receive a method queue (request) more than one time.

In certain implementations, objects interested in context events may implement a listener. The context may invoke the methods of the listener interface on all registered objects to report events. For example, a method for reporting before flushing may be implemented. This method may report that the context is about to be flushed, allowing the listener to queue more operations that may be executed as part of the pending flush. As another example, a method for reporting after flushing may be implemented. This method may report that the context has successfully flushed the queue, allowing the listener to queue more operations that may be executed as part of the flush.

The RPE proxy 15 may be instantiated by a context factory, which may be a static method of the context class. The context factory may also create the other entities used in communication, including object references, values, and methods. Furthermore, the context may provide services for managing channels and method queues, including dynamic method invocation (DMI) with return value processing and synchronization. The context, however, does not have to assume anything about the hosting environment. Furthermore, it is possible to have more than one context in one application program, independent of the threading model. The context can manage a default connection to a business system. A connection can be established by explicit connection method calls.

Initially, the default connection may be bound to the local system. In the local system, method calls may be executed by DMI without serialization and network connectivity. The local context and the system context may be separated. As mentioned previously, channels may be used in communicating between RPE Proxy 15 and RPE 16. For communication between a remote RPE Proxy 15 and RPE 16, a connection may also be established. A connection may be associated with HTTP, Transmission Control Protocol/Internet Protocol (TCP/IP), or RFC protocol and physical transport. A channel can be attached to a physical connection like RFC. However, it is also possible that a user can use a DMI channel, which may have no physical connection behind the scene.

A physical connection typically deals with serialization and deserialization of data. In the DMI-channel scenario, the behavior of the RPE Proxy 15 is similar to that of a physical connection. That is, it queues the method calls. At synchronization time, however, the method queue will be processed via direct DMI on the same computer, and possibly even in the same application context. For the DMI channel, it is not necessary to serialize/deserialize the data. In fact, copying data may be all that is needed to achieve application isolation. The DMI channel, therefore, may provide increased performance if the front end and the back end are running on the same machine in the same environment.

The error states in a Java environment of the RPE proxy 15 may be propagated by standard Java exceptions. On the other hand, as discussed in more detail below, the state of the RPE 16 may be described in an error log, to get a detailed description of multiple errors, that may be collected while processing of the script by the RPE. The error state of the processing engine may also be propagated by a Java exception, but the error log may only access the detailed information.

To assist in development support, the RPE may be integrated into the debugger of the system development environment. Furthermore, trances may be provided.

A bootstrap to get an object reference is to create a new instance of a class by calling a create object method of the RPE proxy context, which creates an instance of a class located on the business system. If no class name is specified, the RPE proxy instance may be used as the returning value of a method call. If the name of the object is not specified, the RPE 16 may generate a new name. When the object is no longer required, it may be released by calling a release object method of the RPE proxy context or by calling the release method of the object. This may be necessary to give the garbage collector of the business system the chance to sweep the corresponding objects (resources) in the business system. Between creation and release, the application program can call methods on the object instance to use the services of the object. Another way to obtain an object instance is to use inner objects, which can be obtained as return values of method calls.

The processing of the script by the RPE 16 may be viewed as having discrete operations. First, the RPE deserializes the script. Deserializing the script may include creating tables specified by the script, creating data types, creating real instances of objects, and so forth. Deserializing the script, however, may be the task of the system in an ABAP environment. These structures are described by the script language, which may, for example, be XML. Then, the RPE marshals the parameters and values that were not specified in the script language. After this, it executes the script lines. Then, the RPE marshals the return values. Finally, it serializes the response. Marshalling the values may be performed on demand when the RPE executes the script lines and builds up the importing and exporting parameters. The marshaled values may be cached in a table 540.

For processing using the previously discussed tables, the RPE inserts object instances in ROT 530. ROT 530 may be a hashed table with the object reference key as a hash key. The ROT is updated when the RPE creates a new object instance, via opcode="C" for the discussed implementation, receives an object instance as a return value of a method call, or releases an object instance, via opcode="R" for the discussed implementation.

Upon receiving a script, interpreter 520 loops over the LINES table, looking at the opcodes. In the case of opcode="C" (i.e., create object), the interpreter assumes two parameters—object key and class name—as type string. The interpreter then loops over the parameters and gets the parameter description from the PARAMS table. For each parameter, the interpreter tries to take the associated value from a cached value table 540. If there is no entry in the table, the interpreter marshals the data to the required data type, type string in this case, and appends the data reference to the cached values table. In an ABAP environment, the marshaled data may be an ABAP data type, which may be created dynamically by CREATE DATA. Then, the interpreter tries to create an instance of the required object class and, if successful, appends the received ABAP object reference to the ROT with the object key as the hash key.

In the case of opcode="R" (i.e., release object), the interpreter 520 performs a lookup in the ROT 430 for the object reference with the object key as the hash key. If there is an object reference, it will be removed from the ROT, and the object will be no longer available. Before removing the object reference from the ROT, however, RPE 16 may try to call the dispose method on the object by dynamic invocation. If there is no dispose method available for the object, however, the execution of the dynamic invocation may be ignored. Note that the memory resource of the objects may be managed by a garbage collector, and, if so, there may be no deterministic point in time when the garbage collector collects objects. Also, as objects are external resources, the Java garbage collector may not manage the life cycle of the resources.

In case of opcode="M" (i.e., call method), interpreter 520 performs a lookup in the ROT 430 for the object reference with the object key as the hash key. Then, the interpreter loops over the importing parameters and retrieves the description of each parameter from the PARAMS table. Also, it examines the cached values table to determine whether the value has already been marshaled. If not, the interpreter creates the appropriate data reference CREATE DATA, marshals the value data to the value type, and appends the data reference in the importing parameter table used by the RPE for the dynamic invocation. The same procedure may be repeated for the exporting parameters. After preparing the importing and exporting parameters, the interpreter calls the method via a dynamic invocation. The same type of operation is valid for opcode="S" (i.e., set property) and opcode="G" (i.e., get property).

After the script has been executed, the interpreter loops over the exporting parameters, serializes the values to a string format (e.g., XML), and appends the associated values to the RETURNS table. Serializing may be the task of the system in an ABAP environment.

In certain implementations, return values may be declared as not relevant for the RPE. The relevant attribute for making such a declaration may attached to the value, because values can be reused in different parameters. The declaration may be made by specifying an attribute/property of a value. The relevant attribute may be a protocol element attached to a value, or it may be realized by a method call on the RPE, assuming the RPE is also reachable via an object interface (e.g., RPE->SetRelevantValue (value, false)).

The foregoing description of the operations for the RPE 16 assumes that no error or exceptions occurred during the processing. Error and exception handling, however, may also be implemented in the RPE.

The error and exception handling is classified in communication errors (including authentication), processing engine execution exceptions (including marshalling and authorization), and exceptions raised from the business object model in a method call. A transport layer like RFC or Web service may handle the communication errors. Possible error states include 'connection could not be established,' 'connection to partner broken,' 'invalid user name or password,' or 'timeout.'

The error categories exposed by the processing engine are those of the processing engine ('RPE') and the business object model ('BOM'). The 'RPE' error category describes exceptions that occurred in the processing while executing the script. Table 6 illustrates possible errors codes.

TABLE 6

Error Codes

| Error Code | Engine State | Description |
|---|---|---|
| AUTHORIZATION | FATAL | The user is not authorized to execute scripts |
| SECURITY_CLASS | RECOVERED | The user is not authorized to use the class |
| SECURITY_METHOD | RECOVERED | The user is not authorized to call the method |
| INVALID_OPCODE | RECOVERED | The opcode of the current script line is not valid |
| INVALID_CLASS | RECOVERED | The class could not be found in class dictionary |
| INVALID_METHOD | RECOVERED | The method could not be found on the object |
| INVALID_TYPE | RECOVERED | The data type is unknown or not valid |
| SYSTEM | FATAL | System exception - the engine context is destroyed |
| DYNAMIC_INVOKE | RECOVERED | The ABAP returns an error in the dynamic invoke |

A fatal engine state means that the processing engine may no longer accept any following script execution requests, and the connection may be closed. A recovered engine state means that the processing engine has detected an error or exception while executing the script. The script is thereby canceled, and the state of the processing engine has been recovered. The engine is able to execute further instructions.

The exceptions of the business object model are class specific. These exception types are part of the 'BOM' error category. In most cases, the processing engine may recover from this kind of exception.

It is possible that the return table RSE_ERRORS_TAB contains more than one error entry. For instance, it is possible that an object raised an exception during a method call.

The exception may be added to the error table. The processing engine will typically cancel the execution, but marshal the processed return values into the RSE_RETURNS_TAB. Potentially, marshalling or system exceptions may be raised at this time.

Because of the powerful and sensitive nature of the back end system, mechanisms for authentication and authorization may be needed. An authentication may be performed by requiring a user name and password verification in the transport layer. The authentication object may be inherited from the system environment. The RPE 16 itself may be protected by an authorization object, which may be maintained and activated for the current user. Furthermore, a class dictionary, to be discussed below, may allow authorization objects to protect classes and even methods of classes. In an ABAP environment, the RPE may use the SAP authorization concepts and infrastructure.

Because it may not be acceptable for the communication layer to be able to instantiate all classes of the back end system, in particular implementations, RPE 16 may have a class dictionary that describes the classes it may instantiate. A single class CL_RSE_CLASS_DICTIONARY may provide the services of the class dictionary. An AUTHORITY_CHECK method of the class dictionary may verify the access permissions of a specified class and method. To interface with the AUTHORITY_CHECK, the following structure may be used:

| AUTHORITY_CHECK | importing | CLASS | type | String |
|---|---|---|---|---|
| | | METHOD | type | String |
| | Exceptions | CLASS_NOT_FOUND | value | 1 |
| | | NO_CLASS_PERMISSION | value | 2 |
| | | NO_METHOD_PERMISSION | value | 3. |

The class dictionary may map between logical and specific class names. To invoke this operation, the following structure may be used:

| GET_CLASS_NAME | importing | NAME | type | String |
|---|---|---|---|---|
| | exporting | CLASS | type | String |
| | exceptions | CLASS_NOT_FOUND | value | 1 |
| | | NO_CLASS_PERMISSION | value | 2. |

The class dictionary may consist of two tables in a system ("S") characteristic and two tables in a local ("L") characteristic. The two S-tables may be transported into destination systems. The two L-tables exist in the source system. Temporary class dictionary entries may exist in the L-tables. The tables may be buffered tables of the system, because fast access to the class dictionary may be important to the RPE.

Tables 7 and 8 illustrate the structure for the S-tables—TRSE_CLASSES and TRSE_METHODS, respectively. The structure of the L-tables—LRSE_CLASSES and LRSE_METHODS—may be similar.

TABLE 7

TRSE_CLASSES Structure

| Field | Type | Description |
|---|---|---|
| NAME | String | The logical class name |
| CLASS | String | The specific class name |
| AUTHORITY | String | The authority object |
| RESTRICTED | String | If set, the authority check is at the method layer |

TABLE 8

TRSE_CLASSES Structure

| Field | Type | Description |
|---|---|---|
| CLASS | String | The specific class name |
| METHOD | String | The method name |
| AUTHORITY | String | The authority object |

Furthermore, the class dictionary may contain class names that are described by logical names. This may allow the RPE to be platform independent, because in different environments, class names may have different notations.

RPE 16 may also have performance and resource monitoring. For example, if a script request results in a fatal state of the processing engine, an error log may be provided in the system log. Monitoring and logging may be needed because of the importance of the communication layer to system operation and security.

In the discussed implementation, only one channel for each context is assumed. However, in other implementations, each RPE proxy instance may be attached to different channels. In these implementations, RPE proxy 15 is responsible guaranteeing the sequential processing of the queued method calls in the distributed environment. To accomplish this, proxy 15 may determine which calls are associated with each channel and which calls should be accomplished before others and then send the part of the queue that is associated with a particular channel. Upon receiving the return values, the proxy may examine the queue for another set of grouped calls and use return values from one channel as an input parameter for calls for another channel. Thus, the application program does not have to care about the synchronization of the calls and can instantiate objects via the RPE proxy 15 on different computers.

Figure 6:
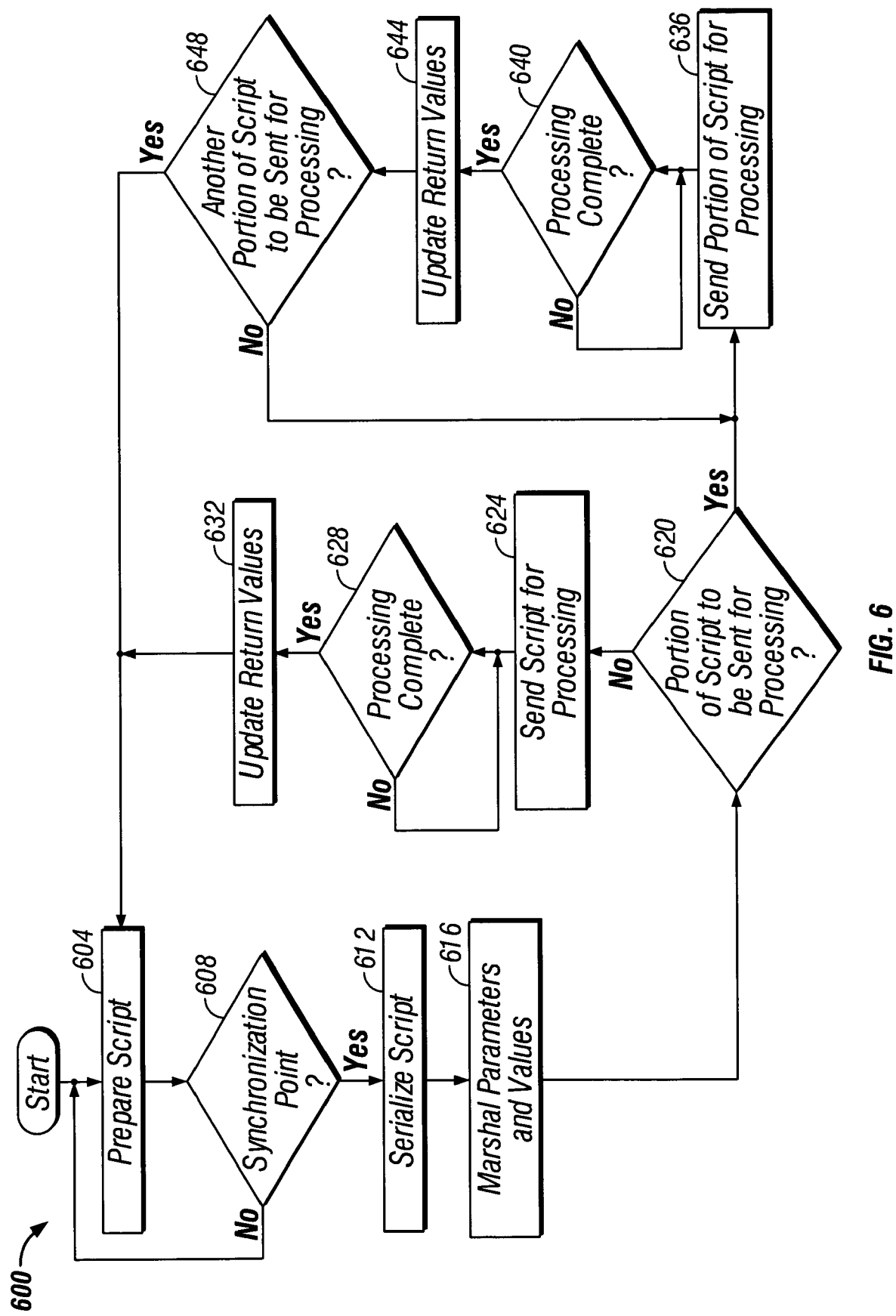
FIG. 6 is a flow chart illustrating a process for business object processing.

FIG. 6 illustrates a process 600 for business object processing. Process 600 may be used by an RPE proxy similar to RPE proxy 15 in FIG. 4.

Process 600 begins with preparing a script for processing business object operations (function block 604). The script may contain, for example, commands to create objects, call methods on objects, and release objects. However, because the commands are not executed, the return values may not be valid at this time.

Process 600 then calls for determining whether a synchronization point has occurred (decision block 608). A synchronization point may occur, for example, when an application program requests a value that has not been returned, meaning that the request invalid. The synchronization point need not be defined by an application program that needs the business objects to be processed.

If a synchronization point has not occurred, process 600 calls for continuing to prepare the script (function block 604). If, however, a synchronization point has occurred, process 600 calls for serializing the script (function block 612). Serializing the script involves putting data in a transportable format. An object reference may be serialized, for instance, by using a name reference. Every object reference, therefore, may also be identified by a unique name, which may be transported as a string over a network.

Process 600 also calls for marshaling parameters and values (function block 616). Marshaling involves handling data types mapping between different environments. For example, different software environments, like Java and ABAP, may have to be linked with different data types, which are similar but not identical.

Process 600 additionally calls for determining whether a portion of the script is to be sent for processing (decision block 620). Determining whether a portion of the script is to be sent for processing may include determining which operations are needed to make a value valid. Previously queued operations may also be designated for processing.

If a portion of the script is not to be sent for processing, process 600 calls for sending the script for processing (function block 624) and waiting for the processing to be completed (decision block 628). The script may be processed by a back end system similar to remote processing engine 16 in FIG. 5. In a single channel scenario, the script may be sent to the back end system in a synchronous way. When the processing is completed, process 600 calls for updating the return values (function block 632) and returning to preparing the script (function block 604).

If, however, a portion of the script is to be sent for processing, process 600 calls for sending a portion of the script for processing (function block 636) and waiting for the processing to be completed (decision block 640). When the processing is completed, process 600 calls for updating the return values (function block 644) and determining whether there is another portion of the script to be sent for processing (decision block 648). If there is another portion of the script to be sent for processing, process 600 calls for sending a portion of the script for processing (function block 636). This may or may not be a different back end system, and, if it is a different one, may be accessed through a different channel. But if another portion of the script is not to be sent for processing, perhaps because the entire script has been processed, process 600 calls for returning to preparing the script (function block 604).

Although FIG. 6 illustrates process 600 for a business object processing, other processes for business object processing may include fewer, additional, and/or a different arrangement of operations. For example, a process may call for determining which portion of the script is to be sent for processing before serializing the script and marshaling parameters and values. As another example, a process may call for continuing to prepare a script while preparing the portion of the script at the synchronization point. As an additional example, a process may not call for determining whether a portion of the script is to be sent for processing. This may occur, for instance, if the script is only associated with a single channel, in which case the entire script may be sent.

Figure 7:
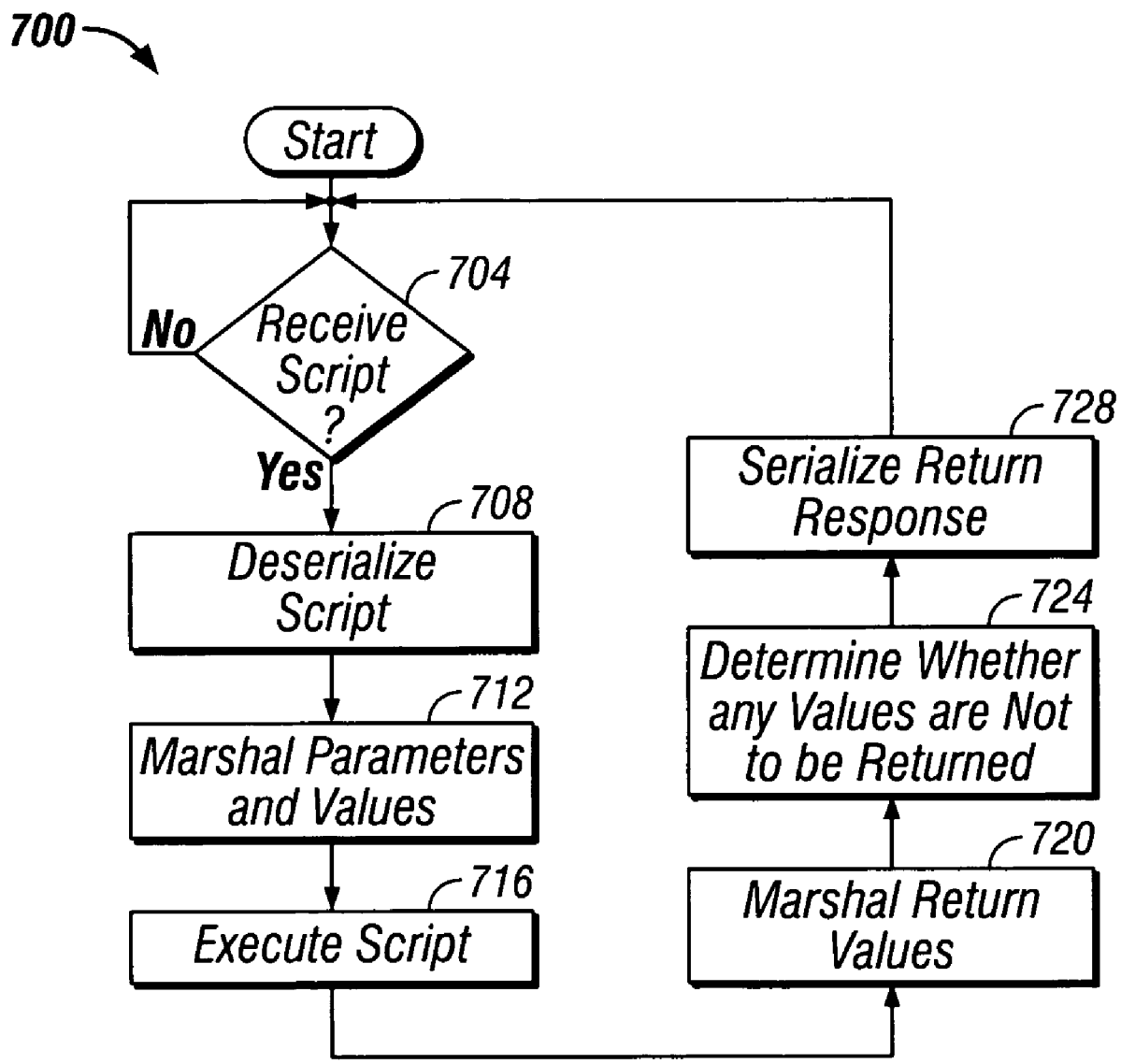
FIG. 7 is a flow chart illustrating a process for business object processing.

FIG. 7 illustrates a process 700 for business object processing. Process 700 may be used by an RPE similar to RPE 16 in FIG. 5.

Process 700 begins with waiting to receive a script (decision block 704). The script may include operations to be performed on business objects and may come from an RPE proxy similar to RPE proxy 15 in FIG. 4.

Upon receiving a script, the RPE deserializes the script (function block 708). Deserializing the script may include creating tables, data types, and other structures specified by the script. These structures may be described by the script language, which may, for example, be XML.

Process 700 also calls for marshalling parameters and values for the script (function block 712). Typically, these parameters and values are ones that were not specified in the script language.

The process additionally calls for executing the script (function block 716). The script may call for creating objects and calling methods on objects. Furthermore, the output of certain executions may be used as the input for other executions.

The process also calls for marshalling return values (function block 720). Marshalling the values may be performed on demand when an RPE executes the script lines and builds up the importing and exporting parameters. The marshaled values may be cached in a table.

The process additionally calls for determining whether any values are not to be returned (function block 724). Determining whether any values are not to be returned may be accomplished, for example, by examining the script, which may contain indicators for values that are not to be returned.

The process then calls for serializing the response (function block 728). Serialization involves putting data in a transportable format. In particular implementations, the return values may be described through a script language such as XML. If any values are not to be returned, they will not be serialized.

Although FIG. 7 illustrates a process 700 for a business object processing, other processes for business object processing may include fewer, additional, and/or a different arrangement of operations. For example, a process may call for marshaling return values while portions of the script are being executed. As another example, a process may call for tracking object instances. As a further example, a check for values not to be returned may not be performed.

Although RPE proxy 15 and RPE 16 have been discussed in the context of providing services for business objects, these entities may also be used in a variety of other environments. For example, the objects do not have to be business objects. Thus, the objects may be for any other type of organization or procedure. As another example, an architecture does not have to include meta data repository 18 or a canonical interface. In general, therefore, the RPE framework can be used in systems that have a numerous operations to be performed on remote objects.

Figure 8:
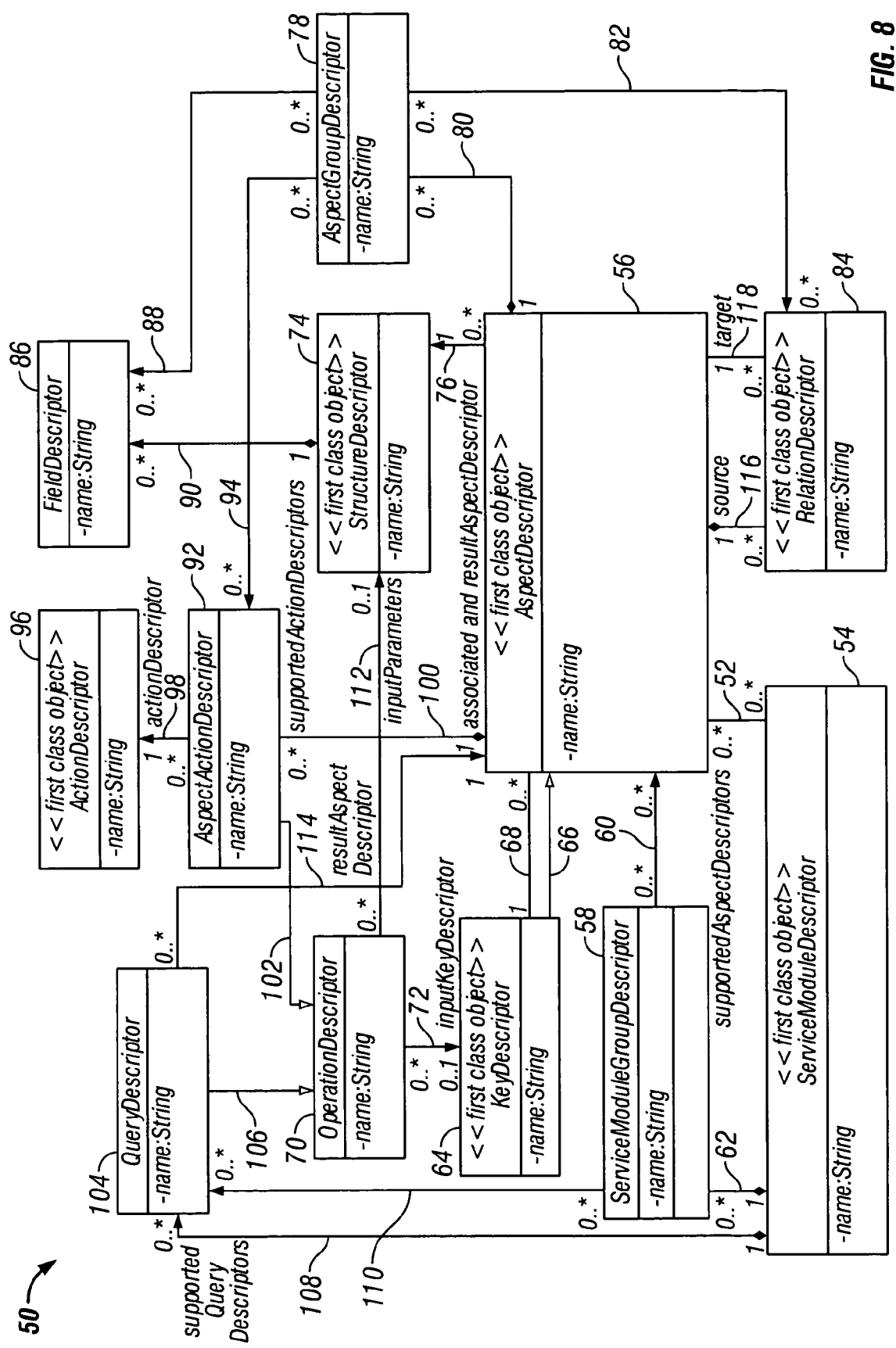
FIG. 8 is a Unified Modeling Language (UML) representation of a structure of a meta model repository.

Returning to FIG. 3, data in the meta data is classified into data types or classes. The names of meta model classes representing data types in repository 18 have the suffix "descriptor" to express their belonging to the meta model and to differentiate them from runtime classes used by service manager 17. Descriptors of classes of the meta data of the repository 18 and their class relations are illustrated using an Unified Modeling Language (UML) class diagram 50 in FIG. 8.

Comparing the meta data to data described by relational database terminology, an aspect in the repository 18 can represent a class or an entity type fully or partially stored in back end database 24 and an aspect descriptor 56 includes attributes for the entity type in addition to other information about the entity type. The meta data in the repository 18 also can include relations descriptors 84 defining relations between aspects that can be implemented in database 24 as relationships using foreign keys in relational databases. The meta data also can include service modules descriptors 54 representing service modules that are aggregations of aspects and have predefined queries for accessing data in database 24.

The service modules defined in repository 18 are the building blocks for a set of applications (e.g., front end application program 12) in business software architecture 2 for a particular application area or industry. The service modules encapsulate the implementation and business logic and provide access to data and functionality in a unified canonical way. Examples for service modules in repository 18 are "business partner", "employee", "sales order" or "business activity". Service modules descriptors 54 describe services modules in the data model of the meta data of the repository 18 and how the service modules can be accessed by queries from application program 12.

In repository 18, each defined query is an entry point to search instances of a data type (represented by an aspect) provided by service providers 26 via service manager 17. A "key" is an identifier of an instance of a data type provided by service providers 26. An "action" is a specialized method on one or more instances of an aspect. A "structure" is the aggregation of attributes representing the data of an aspect. A "relation" is the relation between objects of a source and a target aspect. A service module group is associated with a service module and is an aggregation of aspects, relations, and queries. An aspect group is associated with an aspect and is an aggregation of relations, aspect actions, and field descriptors 86. The meta data in the repository 18 also includes a text description of each aspect, query, key, action, structure, relation, service module group, and aspect group. The framework of the meta data in the repository 18 can be described in terms of data types aspect, query, key, action, structure, relation, service module group, and aspect group.

The data model for attributes of aspects, queries, keys, and actions is based on structure descriptors 74. In one example, every aspect has one structure descriptor 74 that defines the data attributes of the aspect. Structure descriptors 74 refer to a data dictionary in repository 18. A data dictionary is a collection of descriptions of the data objects or items in a data model for the benefit of programmers and others who need to refer to them. The structure descriptors 74 can be defined in an XML Schema or in one or more database tables in repository 18.

In one example, structure descriptors 74 defined in repository 18 include flat structures in database tables. A flat structure is a sequence of pairs of attribute names and field descriptors 86 of simple value types such as real, integer, character string, and Boolean. For instance, a structure descriptor 74 defining a two dimensional point can be a list {X, real, Y, real}, where X and Y are attribute names having real values.

In another example of the repository 18, structure descriptors 74 can include nesting and collections of other structure descriptors 74. Nesting of other structure descriptors 74, or sub structures, to enable the generation of larger aspects is useful whenever the use of keys for sub structures defining smaller aspects does not make sense.

For front end application program 12 to access data (possibly stored in back end database 24) from service providers 20 through the service manager 17, instances of business object classes are identified by unique keys within a service module, for example the number of an order or the id of a product. To differentiate between different types of keys for different aspects in a service module, key descriptors define different types of keys. A key descriptor 64 is associated with a structure descriptor 74 that can include more than one data attribute. In one example, every key has a character string attribute. A service module can be associated with different key descriptors 64 for different aspects (e.g., an order key may have another key descriptor 64 as an order item key).

Service module descriptor 54 includes a collection of aspect descriptors. An aspect descriptor refers to exactly one structure descriptor 74 and one key descriptor 64. The structure descriptor 74 includes all key attributes of the corresponding key descriptor 64. Key descriptors 64 are specialized aspect descriptors 56. The key descriptor 64 attribute of a key refers to itself as a self-reference. Examples for aspect descriptors 56 within a simple sales order service module can include: Order, Order Detail, Shipping Address, Billing Address, and Order Item, as well as descriptors for key aspects like Order ID and Order Item Key. Service module descriptor 54 specifies the collection of supported aspect descriptors 56. Multiple service module descriptors 54 can be associated with the same aspect descriptor 56.

Aspect descriptors 56 relate to each other specified by relation descriptors 84. A relation descriptor 84 has one source aspect descriptor 56 and one target aspect descriptor 56. In this sense, relation descriptors 84 are directed. Relation descriptors 84 also have an optional cardinality (e.g., 1 . . . n) and a category. Supported categories are Parent-Child or Child-Parent.

A relation descriptor 84 defining a relation between source aspect A and target aspect B means that it is possible to traverse from instances of aspect A to instances of aspect B. For example, given that aspects A and B are implemented in back end database 24 as relational database tables, this means that one or more fields in a table corresponding to aspect A point to the primary key of a table corresponding to aspect B.

The relation descriptor 84 defining a Parent-Child relation from source aspect A and target aspect B means that aspect B depends on the existence of aspect A. For example, given that aspects A and B are implemented in back end database 24 as relational database tables, this means that a primary key of a table corresponding to aspect B is derived from a table corresponding to aspect A.

Relation descriptors 84 are introduced to describe internal navigation from one aspect to another within the same service module (e.g., from an order to the shipping address (cardinality 1 . . . 1) or to the order items (cardinality 1 . . . n) within a sales order service module).

Relation descriptors 84 are independent of service modules and can be reused by different service modules. For an internal navigation or traversal from one data type to another in back end database 24, the visible (usable) relation descriptors of a source aspect descriptor 56 are defined by the service module descriptor 54, which has a list of supported relation descriptors 84. Only those relation descriptors 84 are allowed that have a target aspect descriptor 56 that is also supported by the service module descriptor 54.

Operations for accessing and acting on data types in back end database 24 are described in operation descriptors 70. The structure descriptor 74 defines input parameters of the operation descriptor 70. This structure descriptor 70 also includes an input key descriptor 64 that enables mass and filter operations. Mass operations are operations specified by front end application program 12 on multiple instances of a data type in back end database 24. Filter operations filter the results of an operation (e.g., a query) by the keys defined by the input key descriptor. Input parameters for operation descriptors 70 are optional.

There are three types of operation descriptors 70 (i.e., query descriptors 104, aspect action descriptors 92, and action descriptors 96). The aforementioned commands Query and Execute action are defined by operation descriptors 70.

Query descriptors 104 describe query methods that allow searching for instances of aspects within a service module. The query descriptor 104 includes an input parameter, an input key descriptor 64, and a result aspect descriptor 56. The input parameter is a structure descriptor 74 that defines the search parameter structure of the query. The input key descriptor 64 defines which keys may be used for filtering. For example, executing a query defined by a query descriptor 104 with filtering keys results in a list of keys meeting the criteria of the first input. This list of keys is filtered by the set of filtering keys of the input key descriptor 64 so that a subset of the list of keys can be returned. The result aspect descriptor 56 for the query descriptor 104 specifies the type of result of the query, which could be any aspect descriptor 56 that is associated with the service module.

Each service module descriptor 54 has a set of supported query descriptors 104. Service module descriptors 54 cannot use query descriptors 104 defined in other service module descriptors 54 since the query descriptor 104 belongs to one service module descriptor 54. Aspects provide additional operations (beyond the standard operations select, insert, update, delete, select by relation, and update fields) in the form of actions, which are described by aspect action descriptors 92. Aspect action descriptors 92 are specialized operation descriptors 70 on aspects. The aspect descriptor 56 can have a set of supported aspect action descriptors 92. The input parameter for an aspect descriptor 96 defines the parameter structure of the action. The input key descriptor 64 specifies which keys may be used for mass operations (e.g., an email action may have as input a list of keys representing multiple emails).

Action descriptors 96 can define actions for multiple actions like Print, Email, Fax, Approve, Clear, Cut, Copy, Paste and Cancel. But there may be also more aspect specific actions that can be only used for one or a few aspects. Action descriptors 96 are introduced to enforce reuse. Each aspect action descriptor 92 is associated with an action descriptor 96, where the name and the meaning (textual description) are defined.

Action descriptors 96 specify a name and the meaning (textual description) of the action. They do not specify parameters and are not used to describe polymorphic behavior of operations. They can be used for taxonomies.

A service module group descriptor 58 can be associated with aspect descriptors 56, relation descriptors 84, and query descriptors 104. An aspect group descriptor 78 can be associated with relation descriptors 84, aspect action descriptors 92, and field descriptors 86.

Using object-oriented terminology, diagram 50 includes a zero or more to zero or more relationship 52 between service module descriptor 54 and aspect descriptor 56 since aspects can be grouped together in a service module. Service module group descriptor 58 has a zero or more to zero or more directed relation 60 towards aspect descriptor 56 since aspects can be grouped together in a service module group. Service module group descriptor 58 also has a zero or more to one composite aggregation relationship 62 with service module descriptor 54 because service modules can be grouped together in a service module group. Key descriptor 64, as a specialization of aspect descriptor 56, has an inheritance relationship 66 with aspect descriptor 56. Key descriptor 64 also has a one to zero or more relationship 68 with aspect descriptor 56 since each aspect has a key associated with it to uniquely identify instances of the aspect. Operation descriptor 70 has a directed zero or more to zero or more relationship 72 with key descriptor 64 since operations can include input keys. Aspect descriptor 56 has a zero or more to one relationship 76 with structure descriptor 74 since each aspect descriptor 56 can have a structure descriptor defining its attributes. Aspect group descriptor 78 has a zero or more to one composite aggregation relationship 80 with aspect descriptor 56 since aspect groups are aggregations of aspects. Aspect group descriptor 78 also has a directed zero or more to zero or more relationship 82 with relation descriptor 84 since aspect groups also include relations. Structure descriptor 74 has a one to zero or more ownership relationship 90 with field descriptor 86 since a structure can use many data fields to define itself. Aspect group descriptor 78 also has a zero or more to zero or more ownership relationship 88 with field descriptor 86.

Aspect action descriptor 92 has a zero or more to one relationship 100 with aspect descriptor 56 since aspects can provide actions that can be executed on the aspect. Aspect action descriptor 92 has an inheritance relationship 102 with its superior class operation descriptor 70. Query descriptor 104 also has an inheritance relationship 106 with its superior class operation descriptor 70. Service module descriptor 54 has a one to zero or more relationship 108 with query descriptor 104 since a service module includes queries. Service module group descriptor 58 has a zero or more to zero or more directed relationship 110 with query descriptor 104 since queries can also be grouped together in a service module group.

Operation descriptor 70 has a zero or more to zero or one relationship 112 with structure descriptor 74 since each operation includes input parameters in the form of structures. Query descriptor 104 has a zero or more to zero or one relationship 114 with aspect descriptor 56 since queries include a resulting aspect. Lastly, relation descriptor 84 has zero or more to one relationships 116 and 118 with aspect descriptor 56 since relations have source and target aspects.

To illustrate these descriptors defining a framework of the meta data in repository 18, the framework can be implemented using a fixed set of relational database tables. Other persistence mechanisms (e.g., XML) can also be used. The relational database tables are defined in Tables 1-6 where each row of Tables 1-6 defines a field or column of the relational database tables. The main data type of repository 18 is the aspect. The database tables for describing an aspect are Table 9, SCOL_ASPECT, and Table 10, SCOL_ASP_ACTION.

Table 9 includes descriptions of properties of an aspect. The key field for Table 9, SCOL_ASPECT, is the ASPECT_NAME field because an aspect's name is unique for an aspect. The ASPECT_CATEGORY field indicates if the aspect represents a non-key aspect or a key aspect. The STRUCTURE field indicates a structure name for data attributes of the aspect. A key is associated with an aspect by putting the key's name in the KEY_ASPECT field. The SERVICE_PROVIDER field defines the aspect service provider 34 for an aspect. The TRANSAC_PROVIDER field defines the transaction service provider 40 for an aspect. The LOCKING_PROVIDER field defines the locking service provider 42 for an aspect. The repository 18 can also have a corresponding table for the description of an aspect.

TABLE 9

SCOL_ASPECT definition

| Field Name | Key | Description |
| --- | --- | --- |
| ASPECT_NAME | X | Name of the aspect |
| ASPECT_CATEGORY | | Aspect type: aspect or key aspect |
| STRUCTURE | | The corresponding data structure of the aspect |

TABLE 9-continued

SCOL_ASPECT definition

| Field Name | Key | Description |
|---|---|---|
| KEY_ASPECT | | The corresponding key aspect |
| SERVICE_PROVIDER | | The name of the corresponding aspect service provider class |
| TRANSAC_PROVIDER | | The name of the corresponding transaction provider class |
| LOCKING_PROVIDER | | The name of the corresponding locking provider class |

Aspects can provide actions that can be executed on the aspect. Descriptions of the actions are stored in Table 10, SCOL_ASP_ACTION. The actions are uniquely denoted by the aspect name and the name of the action so ASPECT_NAME and ACTION_NAME fields are key fields for SCOL_ASP_ACTION table. The field PARAM_STRUCTURE refers to a data structure that holds input data parameters for the action. The field INPUT_KEY_ASPECT refers to the name of a key aspect that defines the type of keys used to designate which instances of data types in repository 18 are acted upon by the action. The field PROVIDER_CLASS refers to the name of the action service provider class providing the action from the service provider implementing the aspect named in ASPECT_NAME field.

TABLE 10

SCOL_ASP_ACTION definition

| Field Name | Key | Description |
|---|---|---|
| ASPECT_NAME | X | Name of the aspect |
| ACTION_NAME | X | Name of the Action |
| PARAM_STRUCTURE | | The corresponding data structure of the input parameters |
| INPUT_KEY_ASPECT | | The name of the key aspect of the input aspects |
| PROVIDER_CLASS | | The name of the action service provider class |

Aspects can be related with each other. Descriptions of the relations between aspects are stored in Table 11, SCOL_RELATION. A relation is uniquely defined by its name so the key of a relation table is the relation name specified in field RELATION_NAME. For each relation, the field SOURCE_ASPECT defines the aspect that is the source of the directed relation, the field TARGET_ASPECT defines the aspect that is the target of the directed relation, the field TARGET_PROVIDER defines the query relation service provider for the target aspect, the field REL_PARAM_TYPE defines the type of the relation (Parent-Child or Child-Parent), and the field REL_PARAMETER defines the cardinality of the relation. The repository 18 can also have a corresponding table for the description of a relation.

TABLE 11

SCOL_RELATION definition

| Field Name | Key | Description |
|---|---|---|
| RELATION_NAME | X | Name of the relation |
| SOURCE_ASPECT | | Name of the source aspect of the relation |
| TARGET_ASPECT | | Name of the target aspect of the relation |
| TARGET_PROVIDER | | Name of the query relation service provider class |

TABLE 11-continued

SCOL_RELATION definition

| Field Name | Key | Description |
|---|---|---|
| REL_PARAM_TYPE | | Type of the relation |
| REL_PARAMETER | | Parameter of the relation |

The properties of a service module are stored in the Table 12, SCOL_SVC_MODULE. Each Service module is uniquely described by its name so SVC_MODULE_NAME field is the key field for a SCOL_SVC_MODULE table. For each service module, the field TRANSAC_PROVIDER specifies the name of the transaction provider 40 for the service module. The repository also has a corresponding table for the description of a service module.

TABLE 12

SCOL_SVC_MODULE definition

| Field Name | Key | Description |
|---|---|---|
| SVC_MODULE_NAME | X | Name of the service module |
| TRANSAC_PROVIDER | | The name of the corresponding transaction service provider class |

Every service module is associated with aspects that can be used within the service module. Names of the aspects that can be used within each service module are stored in the Table 13, SCOL_ASPECT_USE. Since each aspect-service module usage is uniquely described by a name of a service module and the name of an aspect, the fields SVC_MODULE_NAME and ASPECT_NAME are the keys for SCOL_ASPECT_USE table.

TABLE 13

SCOL_ASPECT_USE definition

| Field Name | Key | Description |
|---|---|---|
| SVC_MODULE_NAME | X | Name of the service module |
| ASPECT_NAME | X | Name of the aspect |

Service Modules can provide queries to retrieve data. Descriptions of the queries of a service module are stored in the table SCOL_QUERY illustrated in Table 14 below. The structure of the database table is defined in Table 14. Since each query is uniquely defined by a service module and a query name, the fields SVC_MODULE_NAME and QUERY_NAME are key fields for SCOLQUERY table. Other fields include RESULT_ASPECT that specifies the name of an aspect defining the data type returned by the query and PARAM_STRUCTURE that specifies a data structure containing the input parameters for the query. For example, a query done on a particular aspect (e.g., specified in field RESULT_ASPECT) associated with the service module can include input parameters that are matched with attributes of instances of the particular aspect and the matching instances are returned as a dataset of keys referring to those instances. The field INPUT_KEY_ASPECT is used to define the key aspect describing keys that could be used as filters for the query. The PROVIDER_CLASS specifies the name of the query service provider 32 associated with each query. The repository also has a corresponding table for the description of a query.

TABLE 14

SCOL_QUERY definition

| Field Name | Key | Description |
|---|---|---|
| SVC_MODULE_NAME | X | Name of the service module |
| QUERY_NAME | X | Name of the query |
| RESULT_ASPECT | | Name of the result aspect of the query |
| PARAM_STRUCTURE | | The corresponding data structure of the input parameters |
| INPUT_KEY_ASPECT | | The name of the key aspect of the input aspects |
| PROVIDER_CLASS | | The name of the corresponding query provider class |

As stated previously, architecture 38 includes six service provider classes (i.e., transaction, query, aspect, action, query relation, and locking) for handling requests from front end application program 12 other than requesting meta data from repository 18 (handled by repository service provider class). To provide services upon request by front end application program 12, service manager 17 directly calls instances of service provider classes. These instances of service provider classes can be located on the same computer (e.g., 6) as service manager 17 or on a different computer.

The locking service provider 42 can be used to implement a generic lock manager for a single aspect or a set of aspects. Each locking service provider 42 needs to be registered with an aspect. The name of the locking service provider 42 is set in SCOL_ASPECT table in LOCKING_PROVIDER field for each aspect. Locking service provider class has two methods that can be called by service manager 17. These are LOCK and UNLOCK. LOCK takes as input a collection of keys representing business objects to be locked, a name of an aspect representing a class of the business objects, and a lock mode. There are various locking modes depending on the locking capability of the target system. Locking mode can specify "E", "S", or "SP". "E" means an exclusive lock or that only one client can obtain the lock. "S" means a shared lock indicating that any clients can lock and no lock exclusive to one client is possible. "SP" means the same as "S" but a subsequent upgrade to an exclusive lock is possible.

LOCK method outputs a Boolean value indicating if the request is rejected or not and also outputs a return code. UNLOCK takes as input a collection of keys representing business objects to be unlocked and a name of an aspect representing a class of the business objects to be unlocked. UNLOCK method also outputs a Boolean value indicating if the request is rejected or not and a return code. A call to UNLOCK is rejected if a transactional buffer is already in a "dirty" state (i.e., if any update, insert, delete operation or an action that is not marked as COL_AFFECTS_NOTHING has been issued since the last CLEANUP call). All locks are removed if the CLEANUP method (described below) of the transaction service provider class is called with reason 'END'.

A transaction is a sequence of information exchange and related work (such as database updating) that is treated as a unit for the purposes of satisfying a request from front end application program 12 to service manager 17 and for ensuring integrity of back end database 24. For a transaction to be completed and changes to database 24 to be made permanent, a transaction has to be completed in its entirety. All of the steps of a transaction are completed before the transaction is successful and the database is actually changed to reflect the new order. If something happens before the transaction is successfully completed, any changes to the back end database 24 must be kept track of so that the changes can be undone.

To handle transactions, the transaction service provider 40 receives notifications on the various states of a transaction between service manager 17, another non-transaction service provider (e.g., 32, 34, 44, 46), and front end application program 12 (or service manager proxy 14 in some cases). These notifications are the transaction service provider 40's methods BEFORE_SAVE, CLEANUP, and SAVE that are called by the service manager 17 during transactions.

The service manager 16 calls the transaction service provider 40's method BEFORE_SAVE to check if the transactional buffer can be saved. This allows checking if the internal state of the non-transaction service provider is ready for being saved. The method BEFORE_SAVE returns false if it is not possible to save the transactional buffer, then the transaction end is aborted. Thus, the BEFORE_SAVE method has a BOOLEAN return parameter. BEFORE_SAVE takes a Boolean as an input rejected. The transactional service provider 16 can prevent the following save and commit operations by setting the REJECTED parameter to a non-initial value (i.e., to "true"). The method BEFORE_SAVE is called within the service manager 16's sequence of operations triggered by the front-end application 12's SAVE method.

The SAVE method finally triggers the application to save the transactional buffer to the database 24. By calling SAVE, all internal state of the non-transaction service provider is made persistent—either by direct updates or by creating appropriate calls to the update task. If all service providers in architecture 38 have received a SAVE request, service manager 17 commits the transaction.

The CLEANUP method tells all non-transaction service providers to release all their transactional buffers and enqueue-based locks. Calling CLEANUP method communicates that all service providers in architecture 38 need to clean up their internal state. CLEANUP takes a REASON string as an input parameter. The REASON field indicates the reason for the clean up operation. This can be either a 'COMMIT' due to a SAVE-operation or the 'END' of the transaction due to the system closing the transaction automatically. There is no guarantee that cleanup is called under failure conditions.

The action service provider 44 is called by service manager 17 to execute an action for an aspect. The name of action service provider 44 is set in the PROVIDER_CLASS field of SCOL_ASP_ACTION table for a row corresponding to an action. Action service provider 44 has one method EXECUTE. EXECUTE method takes as input parameters an aspect name (ASPECT), a set of keys (INKEYS) specifying which instances of the aspect are acted upon by the action, a generic input parameter (INPARAM), the name of the action (ACTION) to be executed, a set of keys (RELATION_IN-KEY) for an action acting on an relation, and a name of the relation (RELATION). EXECUTE method returns as output parameters the changed or newly created objects (OUTRECORDS), which have been modified by the action. The objects returned by the OUTRECORDS parameter are transported back to the calling aspect object on the client framework.

The aspect service provider 34 is called by service manager 17 to provide functionality to read and modify the content of one or more aspects. As described previously, an aspect is described by its name (the name is globally unique within a repository), an associated data structure, an associated key (i.e., identifier) structure, a set of implemented actions, a set of outgoing relations, and a set of incoming relations. Aspect service provider 34 has methods EXECUTE, SELECT, INSERT, UPDATE, DELETE, SELECT_BY_RELATION, and UPDATE_FIELDS.

The method EXECUTE is derived from the action service provider 44 and allows executing an action. EXECUTE has as input parameters a name (ASPECT) of the aspect, where the action is to be executed on, keys (INKEYS) of the objects, where the action is executed on, parameters (INPARAM) for the actions, name (ACTION) of the action. Returned parameters include modified or created aspect rows (OUTRECORDS), a Boolean flag (REJECTED) indicating if the request for the method was rejected or not, and return codes (RETURN_CODES).

The method SELECT reads the aspect data associated with the input keys for a given aspect. SELECT has as input parameters a list of keys (INKEYS) encoded within the associated key structure to describe the aspect rows to read and the name (ASPECT) of the aspect. SELECT has as output parameters the result (OUTRECORDS) encoded in the aspect data structure, a Boolean flag (REJECTED) indicating if the request for the method was rejected or not, and return codes (RETURN_CODES).

The method INSERT inserts new data into an aspect. INSERT includes as input parameters a table containing the records to be inserted, if aspect is designed for row wise write operations (INRECORDS). Depending on the aspect description (ExternalKeys=true/false) for the object the keys of the record can be filled or not. Input parameters also include the name (ASPECT) of the aspect, a set of keys (RELATION_INKEY) for an action acting on a relation, and a name of the relation (RELATION). Method INSERT returns a set of records (OUTRECORDS) representing the inserted records together with their keys and possible other modifications that aspect service provider 34 wants to do on the inserted records. For example one modification can be filling out calculated fields for the set of records. The order of the OUTRECORDS rows has to correspond to the order of the INRECORDS rows. Other output parameters include a Boolean flag (REJECTED) indicating if the request for the SELECT method was rejected or not and return codes (RETURN_CODES).

The UPDATE method updates existing instances of an aspect either record wise or field wise. The input parameters for UPDATE method include a table (INRECORDS) containing the instance keys to be updated, if the aspect is designed for row wise write operations. Input parameters also include the name (ASPECT) of the aspect. Parameters returned by the UPDATE method include the updated records (OUTRECORDS) together with their keys and possible other modifications the service provider wants to do. The order of the OUTRECORDS rows has to correspond to the order of the INRECORDS rows. Other output parameters include a Boolean flag (REJECTED) indicating if the request for the SELECT method was rejected or not and return codes (RETURN_CODES).

The DELETE method deletes rows or instances of an aspect in the back end. Input parameters for DELETE method are a list of keys (INKEYS) encoded within the associated key structure to describe the aspect rows to be deleted and the name (ASPECT) of the aspect. Parameters returned by the DELETE method include a Boolean flag (REJECTED) indicating if the request for the SELECT method was rejected or not and return codes (RETURN_CODES).

The SELECT_BY_RELATION method returns, depending on the relation parameter description, either attributes to follow a relation or already another aspect where the source aspect has a relation pointing to the other aspect. Input parameters for SELECT_BY_RELATION are name (RELATION) of the relation to follow, records (INRECORDS) of the source aspect, name of the source aspect (ASPECT), and a structure (OPTIONS) describing various options of the queries for paging etc. Output parameters returned by SELECT_BY_RELATION include the result encoded in the target aspect data structure (OUTRECORDS), an index table showing which row of the OUTRECORDS parameters belongs to which INRECORDS row (INDEX), a description of the result (DESCRIPTION), a Boolean flag (REJECTED) indicating if the request for the SELECT method was rejected or not and return codes (RETURN_CODES).

The UPDATE_FIELDS method updates fields of instances of an aspect. Input parameters include a list of keys (INRECORDS) encoded within the associated key structure to describe the instances of the aspect to be updated. Input parameters also include a table (INFIELDS) containing pairs of names of fields and corresponding values to be updated within a set of records, if the aspect is designed for field wise write operations. If more than one instance of an aspect is to be updated, the additional field index INKEY points to the associated key record. Input parameters also include the name (ASPECT) of the aspect. Parameters returned by UPDATE_FIELDS include the created or changed instances of the aspect (OUTRECORDS) together with their keys and possible other modifications the aspect service provider 34 did. The index of the various OUTRECORDS rows have to be associated to the row indexes in the INFIELDS table. Other parameters returned include a Boolean flag (REJECTED) indicating if the request for the SELECT method was rejected or not and return codes (RETURN_CODES).

Query service provider 32 performs queries. A query in the repository 18 is described in table SCOL_QUERY by the query name in field QUERY_NAME, the associated parameter structure in field PARAM_STRUCTURE, the associated result aspect in field RESULT_ASPECT, and optionally, the associated aspect key, with its unique data structure in field INPUT_KEY_ASPECT. Query service provider 32 has one EXECUTE method that performs a query on one or more aspects. Input parameters include the name of the query (QUERY), a data structure (INPARAM) containing the parameters for the query, and an optional table-type parameter (INKEYS), containing the keys of the aspect rows to which the query shall be restricted. INKEYS can but does not have to consist of the keys of OUTRECORDS returned by EXECUTE method. INKEYS can be of any key aspect structure. Which key structure is associated to the query is specified in the repository 18 in table SCOL_QUERY in field INPUT_KEY_ASPECT. Optionally, other input parameters can be specified including a structure describing various options (OPTIONS) of the queries (e.g., for paging) and SELECTIONS.

Parameters returned by EXECUTE method include a description (DESCRIPTION) of the query, the query result (OUTRECORDS), and a Boolean flag (REJECTED) indicating if the request for the SELECT method was rejected or not The EXECUTE method returns the results specified by the query parameters. If the INKEYS table parameter is not empty, the result is restricted to the objects that fulfill the query parameters. INKEYS and INPARAM both restrict the query, but are used in different ways. For example, you could create a query that returns a list of orders not yet delivered. The structure INPARAM specifies that only orders from customers with last names from A-D are to be returned. The INKEYS is a table of all orders that have not yet been delivered. OUTRECORDS contains all orders from the relevant customers that have not been delivered yet. The OUTRECORDS result of a query is a disconnected aspect, that is, the aspect is always read-only. No further back end operations can be performed on this aspect. Only the received keys can be used as parameters to select other aspect rows using the aspect service provider 34.

The query relation service provider 46 implements a routine in a service provider (e.g., aspect service provider 34) for an aspect that is the target of a relation. Methods of query relation service provider 46 are indirectly called from the aspect service provider of the source aspect, if the relation is marked as SOURCE_KEYS or ATTRIBUTES.

Query relation service provider 46 has SELECT_TARGET method. The method SELECT_TARGET has input parameters as follows. Input parameters include the name (SOURCE_ASPECT) of the source aspect. Optionally, the method also includes an input parameter defining a proxy interface (TARGET) to the target aspect's SELECT method. Specifying the TARGET parameter allows calling the SELECT method of the aspect service provider for the target aspect without directly knowing the aspect service provider. This enables a query relation service provider to be added to a service module without knowledge of the aspect service provider for the target aspect.

Another input parameter is the relation (RELATION). Another input parameter is a table of fields (INPARAMS) to describe the relation. To allow mass selection INPARAMS is a table where every row describes a single selection. An INDEX parameter is used to relate the various rows of the INPARAMS structure to the OUTRECORDS rows. Another optional input parameter is a structure (OPTIONS) describing various options of the queries (e.g., for paging).

SELECT_TARGET method returns parameters that include the result encoded with the structure of the target aspect (OUTRECORDS), a description of the query result (DESCRIPTION), and a proxy interface to the target aspects SELECT method. Other output parameters include an index (INDEX) to describe the relation between the INPARAMS records and the OUTRECORDS parameter, a Boolean flag (REJECTED) indicating if the request for the SELECT method was rejected or not and return codes (RETURN_CODES).

The service providers 32, 34, 40, 42, 44, and 46, as described above, enable the following transactional model for the architecture 38. Executing method SELECT of aspect service provider 34 reads from the back end database 24 or reads from a transactional buffer build up in the back-end. Aspect service provider 34 merges data from both sources—the database and its transactional buffer—in a consistent way reflecting the updates made so far in this transaction correctly. Next, executing UPDATE, INSERT, MODIFY, or DELETE methods of aspect service provider 34 builds up a transactional buffer. Before actually changing data in the transactional buffer, the service manager 17 has to acquire a transactional lock on the data and read the data under the protection of a lock. There are exclusive, shared, and shared promotable lock modes available using locking service provider 42 as described previously. Locking has to be accompanied by selecting the locked data again under the protection of the lock. Applications can support optimistic locking by providing time-stamped or otherwise versioned data and merging actual and modified data on the front-end on conflicts.

The BEFORE_SAVE method of the transaction service provider 40 enables all participating service providers to declare if they are ready for saving the transactional buffer. The SAVE method of the transaction service provider 40 finally triggers service manager 17 to save the transactional buffer to the back end database 24.

The CLEANUP method of the transaction service provider 40 tells all service providers (e.g., aspect service provider 34) to release all their transactional buffers and enqueue-based locks. If CLEANUP is called with reason 'END', all locks have to be released. If reason is set to 'COMMIT', each service provider can chose to keep its locks. Aspect service provider 34 must not call COMMIT WORK or ROLLBACK WORK internally on its own. The service manager 17 enforces this by automatically aborting the transaction if aspect service provider 34 is trying to commit a transaction.

The supported locking models and lock policies are as follows. Using policy S, many participants can obtain a shared lock. If a shared lock is obtained on an object, no exclusive lock or SP lock can be obtained. Shared locks can only be used to achieve a consistent view on a larger set of data during read operations. Using policy E, only a single participant can obtain a lock. Using policy SP (shared promotable), many participants can obtain the lock. If a SP lock exists, exclusive locks can only be obtained by participants already having a SP lock on the object. Only one of the participants can upgrade the lock to an exclusive lock. No other participant, who did obtain a lock prior to the upgrade, can upgrade to exclusive even if the first participant did release its lock.

EXAMPLE

The architecture 38 (of FIG. 3) implements a simple task of creating a new customer, receiving the customer's order of one or more products via GUI 28 and submitting the order to a business process. To support this example, back end database 24 can be implemented using a relational database designed according to the definitions in Tables 1-6 above to define lists of customers, addresses, product types, baskets, positions of products in a basket for each order, and orders. In Tables 7-12, key fields headings are denoted with an asterisk. Customers Table 15 defines customers and each customer is uniquely identified by a CustomerId field. Customers Table 15 also includes a NAME field and a foreign key field AddressId that links addresses in an Addresses table to customers.

TABLE 15

Customers

| CustomerId* | NAME | AddressId |
|---|---|---|
| 1 | John Smith | 1 |
| 2 | David Klein | 2 |

Addresses Table 16 defines addresses having a town and a street. The Address ID itself is a valid unique key for an address and the connection between address and customer is done through the Customers Table 7 (AddressId field).

TABLE 16

Addresses

| AddressId* | Town | Street |
|---|---|---|
| 1 | Athens | Main Street |
| 2 | Louisville | Willow Avenue |

Table 17 defines products having names with key Product Id.

TABLE 17

Products

| ProductId* | Name |
|---|---|
| 1 | Saw |
| 2 | Hammer |
| 3 | Wrench |
| 4 | Screwdriver |

Table 18 defines shopping baskets having customers with key BasketId.

TABLE 18

Baskets

| BasketId* | CustomerId |
|---|---|
| 1 | 2 |
| 2 | 1 |

Table 19 defines positions of orders in baskets and having products. Positions are dependent on the existence of baskets and orders so the primary key for positions is a combination of PositionId, BasketID, and OrderId.

TABLE 19

Positions

| PositionId* | BasketId* | OrderId* | ProductId |
|---|---|---|---|
| 1 | 1 | 3 | 2 |
| 2 | 1 | 2 | 3 |
| 3 | 2 | 1 | 4 |

Table 20 defines orders having customers and indicating whether or not each order is submitted with primary key OrderId.

TABLE 20

Orders

| OrderId* | CustomerId | Submitted |
|---|---|---|
| 1 | 1 | False |
| 2 | 2 | False |
| 3 | 2 | False |

Figure 9:
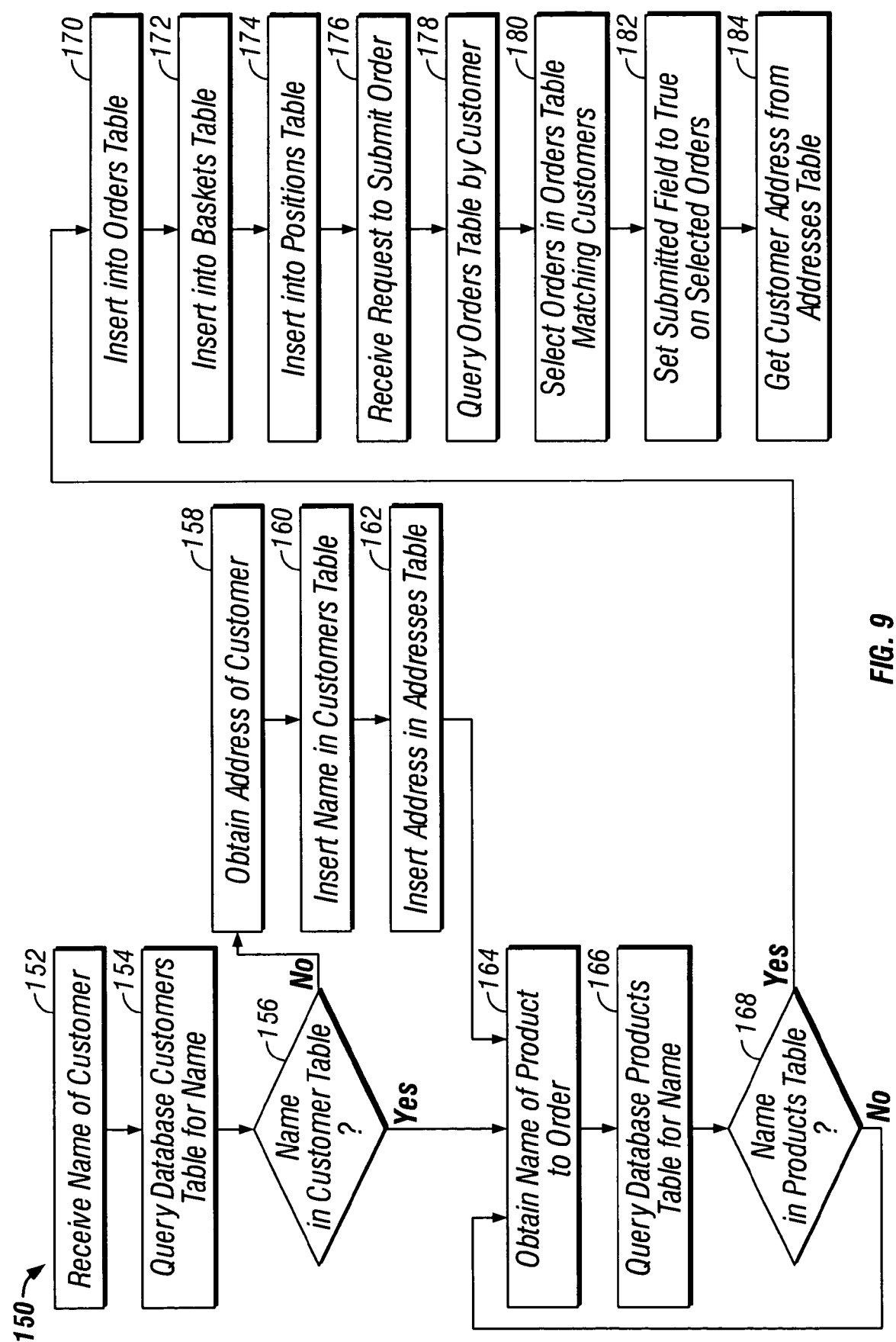
FIG. 9 is a flow diagram of a business process.

As shown in FIG. 9, process 150 defines the database operations on back end database 22 that are needed for this simple task using these tables 15-20. Process 150 includes front end application program 12 receiving (152) a name of a customer. Process 150 includes the business software application querying (154) a database with Customers table (Table 15) for the name in the NAME field. Process 150 includes checking if the customer's name matches (156) a row in the Customers table (Table 15). If no match is made, process 150 includes the business software application obtaining (158) the address of the customer, inserting (160) a new row in the Addresses table (Table 16) with a new AddressId and address, and inserting (162) a new row in the Customers table (Table 15) with a new CustomerId, and inserting (162) a new row in the Addresses table (Table 16) with a new CustomerId and the AddressId. If a match is made, process 150 includes the business software obtaining (164) a name of a product to order for the customer. Process 150 includes the business software querying (166) the Products table (Table 17) for the product name.

Process 150 includes checking if the product name matches (168) a row in the Products table (Table 17). If a match is made, then process 150 includes the business software inserting (170) a new order in the Orders table (Table 20) with the customer's CustomerId and setting the Submitted field to "False". Otherwise, process 150 returns to obtaining (164) the name of the product to order. Process 150 includes the business software inserting (172) a new basket in the Basket table (Table 18) with the customer's CustomerId.

Process 150 includes the business software inserting (174) a new position in the Positions table (Table 19) with the CustomerId, BasketId, and ProductId. Process 150 includes the business software receiving (176) a request to submit the order. Process 150 includes the business software querying (178) the Orders table (Table 20) by the customer's CustomerId and this query returns orders matching the customer's CustomerId. Process 150 includes the business software selecting (180) orders in the Orders table (Table 20) matching the orders for the customer's CustomerId. Process 150 includes the business software setting (182) the Submitted field in the selected rows in the Orders table (Table 20) to "True". Process 150 includes the business software getting (184) the address of the customer from the Addresses Table 16 for order delivery by querying Customers Table 15 for an AddressId and then querying Addresses Table 16 for a matching AddressId.

Tables 21-27 show tables in one implementation of repository 18 representing meta data for the example database illustrated by Tables 15-20. Tables 21-27 follow the definitions of Tables 9-14 described above such that definitions in rows of Tables 9-14 correspond to columns or fields in Tables 21-27. As with Tables 15-20, key fields in Tables 21-27 are labeled by an asterisk.

Table 21 follows the definition of a SCOL_ASPECT table (defined in Table 9) to define aspects A_Customer, A_Address, A_Product, A_Basket, A_Position, and A_OrderHeader. Each aspect has a corresponding key aspect that defines a unique key for each instance. For example, aspect A_Customer has a key aspect Customer_Key. This key aspect in the meta data repository 18 can correspond to a key for a relational database table in back end database 24. For example, the key for Customers table (Table 15) is CustomerId field. The rows in STRUCTURE field correspond to a data dictionary in Table 27 below. For example, Table 27 can define Customer_Structure to have a NAME field of type CHAR indicating a character string. The rows in SERVICE_PROVIDER field correspond to particular aspect service providers handling services for aspects. In Table 21, all of the aspects are assigned to S_provider aspect service provider (e.g., 34 referring to FIG. 3). The rows in TRANSAC_PROVIDER field correspond to particular transaction service providers 40 handling transactions for aspects. In Table 21, all of the aspects are assigned to T_provider transaction service provider (e.g., 40 referring to FIG. 3). The rows in LOCKING_PROVIDER field correspond to particular locking service providers handling locking for aspects. In Table 21, all of the aspects are assigned to L_provider locking service provider (e.g., 42 referring to FIG. 3).

TABLE 21

Example SCOL_ASPECT table

| ASPECT_NAME* | ASPECT_CATEGORY | STRUCTURE | KEY_ASPECT | SERVICE_PROVIDER | TRANSAC_PROVIDER | LOCKING_PROVIDER |
|---|---|---|---|---|---|---|
| A_Customer | Aspect | Customer_Structure | Customer_Key | S_provider | T_provider | L_provider |

TABLE 21-continued

Example SCOL_ASPECT table

| ASPECT_<br>NAME* | ASPECT_<br>CATEGORY | STRUCTURE | KEY_<br>ASPECT | SERVICE_<br>PROVIDER | TRANSAC_<br>PROVIDER | LOCKING_<br>PROVIDER |
|---|---|---|---|---|---|---|
| Customer_Key | key aspect | Customer_Key_Table | Customer_Key | S_provider | T_provider | L_provider |
| A_Address | Aspect | Address_Structure | Address_Key | S_provider | T_provider | L_provider |
| Address_Key | key aspect | Address_Key_Table | Address_Key | S_provider | T_provider | L_provider |
| A_Product | Aspect | Product_Structure | Product_Key | S_provider | T_provider | L_provider |
| Product_Key | key aspect | Product_Key_Table | Product_Key | S_provider | T_provider | L_provider |
| A_Basket | Aspect | Basket_Structure | Basket_Key | S_provider | T_provider | L_provider |
| Basket_Key | key aspect | Basket_Key_Table | Basket_Key | S_provider | T_provider | L_provider |
| A_Position | Aspect | Position_Structure | Position_Key | S_provider | T_provider | L_provider |
| Position_Key | key aspect | Position_Key_Table | Position_Key | S_provider | T_provider | L_provider |
| A_OrderHeader | Aspect | OrderHeader_Structure | OrderHeader_Key | S_provider | T_provider | L_provider |
| OrderHeader_Key | key aspect | OrderHeader_Key_Table | OrderHeader_Key | S_provider | T_provider | L_provider |

Table 22 follows the definition of a SCOL_ASP_ASPECT table (defined in Table 10) to define an action Submit for aspect A_OrderHeader. Field INPUT_KEY_ASPECT specifies the key aspect that is sent by application 14 with the action to specify which instances of aspect A_OrderHeader should be acted upon by the action. Action Submit changes the Submitted field of those instances in back end database 24 to True. No extra parameters are required for this action Submit so PARAM_STRUCTURE field is blank in Table 22. Field PROVIDER_CLASS specifies the aspect service provider 34 (referring to FIG. 3) assigned to each action. In Table 22, action Submit is assigned to aspect service provider S_provider (e.g., 34 referring to FIG. 3).

TABLE 22

Example SCOL_ASP_ACTION Table

| ASPECT_NAME* | ACTION_NAME* | PARAM_STRUCTURE | INPUT_KEY_ASPECT | PROVIDER_CLASS |
|---|---|---|---|---|
| A_OrderHeader | Submit | | OrderHeader_Key | S_provider |

Figure 10:
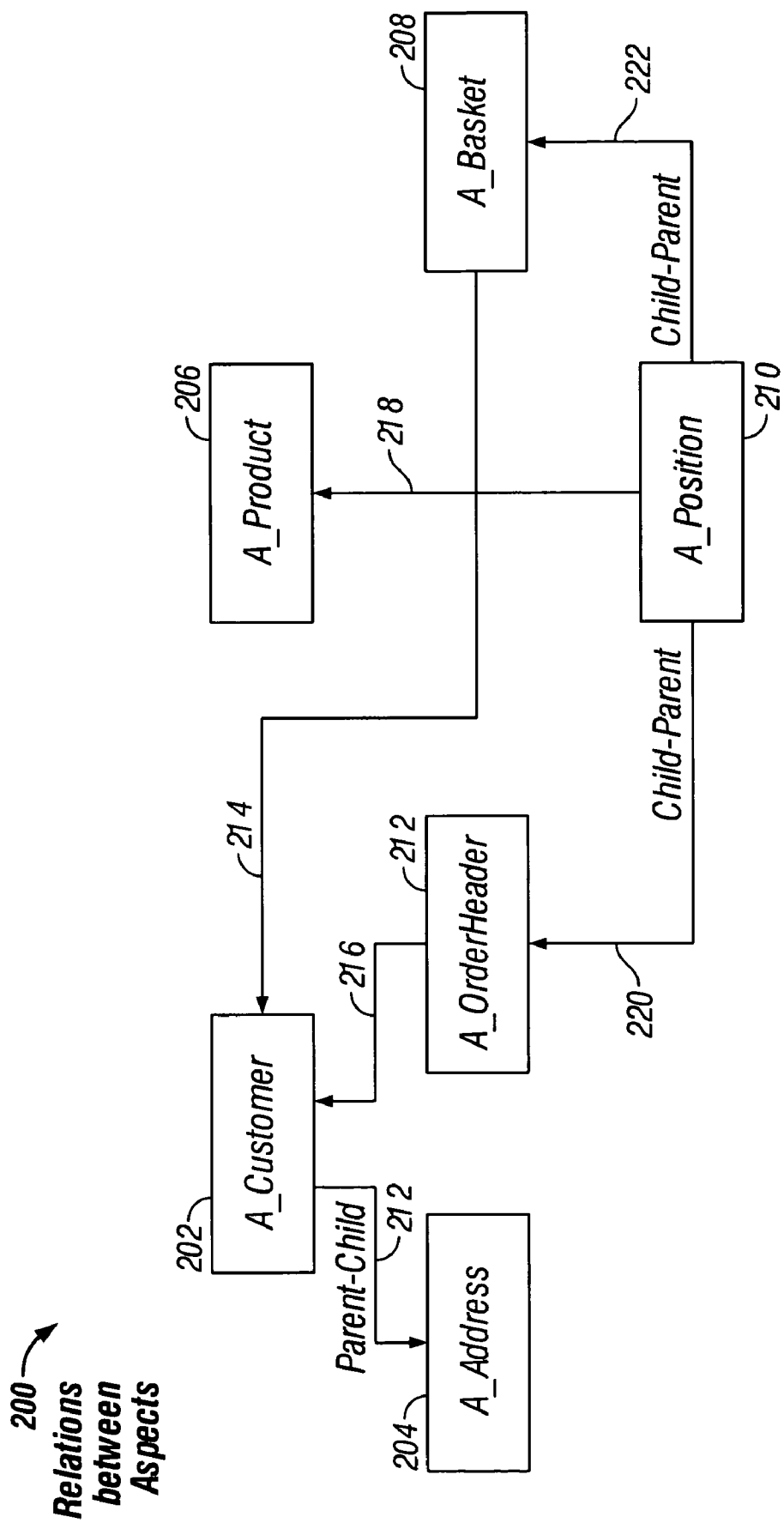
FIG. 10 is a diagram showing relations between different aspects for a business software application.

Table 23 follows the definition of a SCOL_RELATION table (defined in Table 11) to define relations between aspects defined in Table 21. These relations reflect relations between data tables in back end database 24 illustrated by example tables 7-12. These relations between aspects are also illustrated in FIG. 10 for aspect A_Customer 202, aspect A_Address 204, aspect A_Product 206, aspect A_Basket 208, aspect A_Position 210, and aspect A_OrderHeader 112. These relations include R_Customer_To_Address 212, R_Basket_To_Customer 214, R_OrderHeader_To_Customer 216, R_Position_To_Product 218, R_Position_To_OrderHeader 220, and R_Position_To_Basket 222.

TABLE 23

Example SCOL_RELATION Table

| RELATION_<br>NAME* | SOURCE_<br>ASPECT | TARGET_<br>ASPECT | TARGET_<br>PROVIDER | REL_PARAM_<br>TYPE | REL_<br>PARAMETER |
|---|---|---|---|---|---|
| R_Customer_To_Address | A_Customer | A_Address | S_provider | Parent-Child | |

TABLE 23-continued

Example SCOL_RELATION Table

| RELATION_NAME* | SOURCE_ASPECT | TARGET_ASPECT | TARGET_PROVIDER | REL_PARAM_TYPE | REL_PARAMETER |
|---|---|---|---|---|---|
| R_Basket_To_Customer | A_Basket | A_Customer | S_provider | | |
| R_OrderHeader_To_Customer | A_OrderHeader | A_Customer | S_provider | | |
| R_Position_To_Product | A_Position | A_Product | S_provider | | |
| R_Position_To_OrderHeader | A_Position | A_OrderHeader | S_provider | Child-Parent | |
| R_Position_To_Basket | A_Position | A_Basket | S_provider | Child-Parent | |

Table 24 follows the definition of a SCOL_SVC_MODULE table (defined in Table 12) to define example service modules for the example definitions of back end database 24 given in tables 7-12. Table 24 defines service modules S_Customer, S_Product, S_Basket, and S_Order. Field TRANSAC_PROVIDER specifies a transaction service provider 40 (referring to FIG. 3) to each service module. In Table 24, transaction service provider T_provider (e.g., 40, referring to FIG. 3) is assigned to the service modules.

TABLE 24

Example SCOL_SVC_MODULE Table

| SVC_MODULE_NAME* | TRANSAC_PROVIDER |
|---|---|
| S_Customer | T_provider |
| S_Product | T_provider |
| S_Basket | T_provider |
| S_Order | T_provider |

Table 25 follows the definition of a SCOL_ASPECT_USE table (defined in Table 21) to associate service modules (provided by Table 24) with aspects (provided by Table 21).

TABLE 25

Example SCOL_ASPECT_USE Table

| SVC_MODULE_NAME* | ASPECT_NAME* |
|---|---|
| S_Customer | A_Customer |
| S_Customer | A_Address |
| S_Product | A_Product |

TABLE 25-continued

Example SCOL_ASPECT_USE Table

| SVC_MODULE_NAME* | ASPECT_NAME* |
|---|---|
| S_Basket | A_Basket |
| S_Basket | A_Position |
| S_Order | A_OrderHeader |
| S_Order | A_Position |

Table 26 follows the definition of a SCOL_QUERY table (defined in Table 14) to define queries designed to facilitate business process 150 of FIG. 9. For example, QueryByName query associated with S_Customer service module takes a Customer_Stucture as input for the query and a set of customer keys (Customer_Key) that defines which keys may be used for filtering. Field PROVIDER_CLASS specifies which query service provider 32 (referring to FIG. 3) is associated with each service module. In Table 26, query service provider Q_provider (e.g., 32) is associated with each service module.

TABLE 26

Example SCOL_QUERY Table

| SVC_MODULE_NAME* | QUERY_NAME* | RESULT_ASPECT | PARAM_STRUCTURE | INPUT_KEY_ASPECT | PROVIDER_CLASS |
|---|---|---|---|---|---|
| S_Customer | QueryByName | Customer_Key | Customer_Structure | Customer_Key | Q_provider |
| S_Product | QueryByName | Product_Key | Product_Structure | Product_Key | Q_provider |
| S_Basket | QueryByCustomer | Basket_Key | Customer_Structure | Customer_Key | Q_provider |
| S_OrderHeader | QueryByCustomer | OrderHeader_Key | Customer_Structure | Customer_Key | Q_provider |

Table 27 defines a data dictionary for the implementation of repository 18 defined in Tables 13-18. Each row defines a structure having a name and multiple data entries and their types. For example, structure Customer_Structure has one data entry titled "NAME" with a CHAR type indicating a character string. The Customer_Key_Table structure defines a CustomerId key for each customer and also has a CHAR type.

TABLE 27

Example SCOL_STRUCT Table

| STRUCT_NAME* | DATA1 | TYPE1 | DATA2 | TYPE2 |
|---|---|---|---|---|
| Customer_Structure | NAME | CHAR | | |
| Customer_Key_Table | CustomerId | CHAR | | |
| Address_Structure | Town | CHAR | Street | CHAR |
| Address_Key_Table | AddressId | CHAR | | |
| Product_Structure | Name | CHAR | ProductId | CHAR |
| Product_Key_Table | ProductId | CHAR | | |
| Basket_Structure | | | | |
| Basket_Key_Table | BasketId | CHAR | | |
| Position_Structure | | | | |
| Position_Key_Table | PositionId | CHAR | | |
| OrderHeader_Structure | Submitted | CHAR | | |
| OrderHeader_Key_Table | OrderId | CHAR | | |

The database operations described above for process 150 are defined in this implementation of repository 18 as follows. Querying (154), included in process 150, of the Customers database table (Table 15) is described in meta data repository 18 by the QueryByName query associated with aspect service module S_Customer in Table 26. This QueryByName query associated with aspect service module S_Customer is selected because the front end application program 12 has obtained a customer name and service module S_Customer contains aspects with customer names. For example, front end application program 12 can submit query QueryByName associated with service module S_Customer with NAME="John Smith" and no filtering Customer_Key specified to service manager 17. Service manager 17 checks repository 18 to ensure that the query is defined. Service manager 17 then submits the query to Q_provider (e.g., 32) that queries the Customer database table (Table 15) in database 24 and the output is sent back to front end application program 12 is a record set containing CustomerId={1}.

Inserting (160), included in process 150, on Addresses database table (Table 16) and inserting (162), included in process 150, on Customers database table (Table 15) are described by standard Insert operations (described previously) on aspects A_Address and A_Customer, respectively, in the meta data repository 18.

Querying (166), included in process 150, on the Products database table (Table 17) for a product name is described by QueryByName query associated with service module S_Product defined in Table 26. For example, application 12 can submit the query QueryByName associated with service module S_Product with Name="Wrench" and no filtering Product_Key specified to service manager 17. Service manager 17 checks repository 18 to ensure that the query is defined. Service manager 17 then submits the query to Q_provider (e.g., 32) queries database 24 and the output sent back to application 12 is a record set containing ProductId={3}.

Inserting (170, 172, and 174), included in process 150, are defined by insert operations on aspects A_OrderHeader, A_Basket, and A_Position, respectively.

Querying (178), included in process 150, Orders database table (Table 12) by customer is described by the QueryByCustomer query associated with service module S_Order defined in Table 26. For example, front end application program 12 can submit query QueryByCustomer associated with service module S_Order with Customer_Key (CustomerId)={2} and no filtering OrderHeader_Key. Service manager 17 checks repository 18 to ensure that the query is defined. Service manager 17 then submits the query to Q_provider (e.g., 32) that queries database 24 and the output is sent back to application 12 is a record set containing OrderHeader_Key (OrderId)={2, 3}.

Selecting (180), included in process 150, order operation on Orders database table (Table 12) and setting (182) submitted field to true on selected orders are defined by the Execute Submit action (defined in Table 14) on aspect A_OrderHeader in repository 18. For example, front end application program 12 sends the Submit action on aspect A_OrderHeader to service manager 17 with OrderHeader_Key={2, 3}. Service manager 17 then sends the submit operation to S_provider (e.g., 34) that changes the Submitted field in Orders database table (Table 12) to "True" for selected rows corresponding to OrderId={2, 3}.

Getting (184) customer address, included in process 150, from Addresses database table (Table 16) is defined by the standard Select By Relation action on A_Customer aspect. For example, the front end application program 12 sends a Select By Relation action on A_Customer aspect specifying relation R_Customer_To_Address and Customer_Key={2} to service manager 17. Service manager 17 checks the request against repository 18 and passes the request to service provider S_provider (e.g., 34) that looks up foreign key AddressId matching CustomerId={2} and navigates to Addresses table 16. S_provider (e.g., 34) returns a record set containing {Louisville, Willow Avenue} from Addresses database table (Table 16) to application 12 via service manager 17.

Implementations can be accomplished using digital electronic circuitry, or computer hardware, firmware, software, or combinations of them. Implementations can also be accomplished using a computer program product (i.e., a computer program tangibly embodied in an information carrier (e.g., in a machine-readable storage device or in a propagated signal) for execution by, or to control the operation of, data processing apparatus (e.g., a programmable processor, a computer, or multiple computers)). A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Process steps of the various implementations can be performed by one or more programmable processors executing a computer program to perform functions of the implementations by operating on input data and generating output. Process steps can also be performed by, and apparatus implementations made by, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). Information carriers suitable for embodying computer program instructions and data include all forms of non-volatile memory, including by way of example semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory can be supplemented by, or incorporated in special purpose logic circuitry.

Various implementations can be implemented in a computing system that includes a back-end component (e.g., as a data server), a middleware component (e.g., an application server), a front-end component (e.g., a client computer having a graphical user interface or a Web browser through which a user can interact with an implementation), or any combination of such back-end, middleware, or front-end components. Numerous implementations have been discussed and suggested. Other implementations are within the scope of the following claims.

What is claimed is:

1. A method for application business object processing, the method comprising:
   receiving a script from a processing engine proxy, the script comprising a plurality of business object operations for an application, wherein at least one input in the script comprises a multi-dimensional data type, and wherein the processing engine proxy is operable to:
   prepare the script;
   determine a synchronization point at which an application requested a value that was not returned;
   prepare to send at least a portion of the script for processing if the synchronization point has occurred, the preparing further comprising:
   serializing the script into a transportable format, wherein an obiect reference is serialized using a name reference; and
   marshaling parameters of the script by mapping between a current environment and a destination environment;
   determine whether processing of the script is complete; and
   update return values if processing of the script is complete;
   initiating execution of the operations;
   determining whether a result of an executed operation is input for another operation;
   if a result of an executed operation is input for another operation, using the result in the input for the other operation;
   determining whether a result is relevant for the application using an identifier in the script;
   if a result is not relevant for the application, refusing to return the result; and
   returning the results of the executed operations.

2. The method of claim 1, wherein initiating execution of the operations comprises deserializing the script and marshaling values.

3. The method of claim 1, further comprising tracking business object instances.

4. The method of claim 1, further comprising:
   monitoring performance and resources; and
   creating an error log if a fatal state occurs during processing.

5. The method of claim 1, wherein the script comprises strings in a hierarchical structure.

6. The method of claim 1, wherein the business objects may exist on different machines.

7. An application business object processing framework tangibly embodied in a computer readable storage medium, the framework comprising:
   a processing engine proxy operable to:
   prepare a script;
   determine a synchronization point at which an application reguested a value that was not returned;
   prepare to send at least a portion of the script for processing if the synchronization point has occurred, the preparing further comprising:
   serializing the script into a transportable format, wherein an obiect reference is serialized using a name reference; and
   marshaling parameters of the script by mapping between a current environment and a destination environment
   determine whether processing of the script is complete; and
   update return values if processing of the script is complete; and
   a processing engine operable to:
   receive the script comprising a plurality of business object operations for an application, wherein at least one input in the script comprises a multi-dimensional data type;
   initiate execution of the operations;
   determine whether a result of an executed operation is input for another operation;
   if a result of an executed operation is input for another operation, use the result as input for the other operation;
   determine whether a result is relevant for an application using an identifier in the script;
   if a result is not relevant for the application, refuse to return the result; and
   return the results of the executed operations.

8. The framework of claim 7, wherein the multi-dimensional data type comprises a table.

9. The framework of claim 7, wherein the multi-dimensional data type is self-describing.

10. The framework of claim 7, wherein initiating execution of the operations comprises deserializing the script and marshaling values.

11. The framework of claim 7, wherein returning the results of the executed operations to the application comprises serializing the results.

12. The framework of claim 7, wherein the processing engine is further operable to track business object instances.

13. The framework of claim 12, wherein the business object instances are tracked in a running object table.

14. The framework of claim 7, wherein the business object operations are described in Remote Function Call transport protocol.

15. The framework of claim 14, wherein the script contains parameters and values.

16. The framework of claim 7, wherein the script comprises strings in a hierarchical structure.

17. The framework of claim 7, wherein the processing engine is further operable to:
   monitor performance and resources; and
   create an error log if a fatal state occurs in the processing engine.

18. The framework of claim 7, wherein the business objects may exist on different machines.

19. The framework of claim 7, wherein the engine provides an interface for creating business objects, calling methods on business objects, and releasing business objects.

20. An article comprising a machine-readable medium storing instructions operable to cause one or more machines to perform operations comprising:

determining whether a script comprising a plurality of business object operations for an application has been received from a processing engine proxy, wherein at least one input in the script comprises a multi-dimensional data set, and wherein the processing engine proxy is operable to:
prepare the script;
determine a synchronization point at which an application reauested a value that was not returned;
prepare to send at least a portion of the script for processing if the synchronization point has occurred, the preparing further comprising:
serializing the script into a transportable format, wherein an object reference is serialized using a name reference; and
marshaling parameters of the script by mapping between a current environment and a destination environment;
determine whether processing of the script is complete: and
update return values if processing of the script is complete;
initiating execution of the operations;
determining whether a result of an executed operation is input for another operation;
if a result of an executed operation is input for another operation, using the result in the input for the other operation;
determining whether a result is relevant for the application using an identifier in the script;
if a result is not relevant for the application, refusing to return the result; and
returning the results of the executed operations.

21. The article of claim 20, wherein initiating execution of the operations comprises deserializing the script and marshaling values.

22. The article of claim 20, wherein returning the results of the executed operations comprises serializing the results.

23. The article of claim 20, wherein the instructions are further operable to cause one or more machines to perform operations comprising tracking business object instances.

24. The article of claim 20, wherein the instructions are further operable to cause one or more machines to perform operations comprising:
monitoring performance and resources; and
creating an error log if a fatal state occurs during processing.

25. The article of claim 20, wherein the script comprises strings in a hierarchical structure.

26. The article of claim 20, wherein the business objects may exist on different machines.

27. A method for application business object processing, the method comprising:
preparing a script comprising a plurality of business object operations for an application, wherein at least one of the inputs for the script comprises a multi- dimensional data type;
determining whether a synchronization point defined by the application has occurred;
if a synchronization point has occurred, preparing to send at least a portion of the script to a processing enaine for processing. the preparing further comprising:
serializing the script into a transportable format, wherein an obiect reference is serialized using a name reference; and
marshaling parameters of the script by mapping between a current environment and a destination environment,
wherein the processing engine is operable to:
receive the script;
initiate execution of the operations;
determine whether a result of an executed operation is input for another operation;
if a result of an executed operation is input for another operation. use the result as input for the other operation;
determine whether a result is relevant for an application using an identifier in the script;
if a result is not relevant for the application, refuse to return the result; and
return the results of the executed operations;
determining whether processing of the script portion is complete; and
if processing of the script portion is complete, updating return values.

28. The method of claim 27, wherein a synchronization point comprises an application requesting a value that has not been returned.

29. The method of claim 27, wherein preparing to send at least a portion of the script for processing comprises:
serializing the script; and
marshaling parameters and values.

30. The method of claim 27, further comprising determining whether a portion of the script should be sent for processing.

31. The method of claim 30, wherein determining whether a portion of a script should be sent for processing comprises determining whether a portion of the script is associated with a specific processing engine.

32. The method of claim 30, further comprising sending a second portion of the script for processing after the first portion of the script has been processed if a portion of the script should be sent for processing.

33. An article comprising a machine-readable medium storing instructions operable to cause one or more machines to perform operations comprising:
preparing a script comprising a plurality of business object operations for an application, wherein at least one of the inputs for the script comprises a multi- dimensional data type;
determining whether a synchronization point defined by the application has occurred;
if a synchronization point has occurred, preparing to send at least a portion of the script to a processing engine for processing, the preparing further comprising:
serializing the script into a transportable format, wherein an obiect reference is serialized using a name reference; and
marshaling parameters of the script by mapping between a current environment and a destination environment,
wherein the processing engine is operable to:
receive the script;
initiate execution of the operations;
determine whether a result of an executed operation is input for another operation;
if a result of an executed operation is input for another operation, use the result as input for the other operation;
determine whether a result is relevant for an application using an identifier in the script;
if a result is not relevant for the application, refuse to return the result;and
return the results of the executed operations;
determining whether processing of the script portion is complete; and if processing of the script portion is complete, updating return values.

34. The article of claim 33, wherein a synchronization point comprises an application requesting a value that has not been returned.

35. The article of claim 33, wherein preparing to send at least a portion of the script for processing comprises:
serializing the script; and
marshaling parameters and values.

36. The article of claim 33, wherein the instructions are further operable to cause one or more machines to perform operations comprising determining whether a portion of the script should be sent for processing.

37. The article of claim 36, wherein determining whether a portion of a script should be sent for processing comprises determining whether a portion of the script is associated with a specific processing engine.

38. The article of claim 36, wherein the instructions are further operable to cause one or more machines to perform operations comprising sending a second portion of the script for processing after the first portion of the script has been processed if a portion of the script should be sent for processing.

39. A system for application business object processing, the system comprising:
a processing engine proxy tangibly embodied in a computer readable storage medium, the processing engine proxy operable to:
interface with an application to prepare a script comprising a plurality of business object operations for the application, wherein the operations are described in Remote Function Call transport protocol and at least one of the inputs comprises a self-describing, multi-dimensional data type,
determine whether a synchronization point has occurred,
if a synchronization point has occurred, determine whether at least a portion of the script should be sent to a processing engine,
prepare to send at least a portion of the script to a processing engine, the preparing further comprising:
serializing the script into a transportable format, wherein an obiect reference is serialized using a name reference; and
marshaling parameters of the script by mapping between a current environment and a destination environment;
determine whether processing of the script portion is complete, and
if processing of the script portion is complete, update return values; and
a processing engine, the processing engine operable to:
receive the script portion,
deserialize the operations,
marshal parameters and values for the operations,
initiate execution of the operations,
determine whether a result of an executed operation is input for another operation,
if a result of an executed operation is input for another operation, use the result as input for the other operation,
determine whether a result is relevant for the application,
if a result is not relevant for the application, refuse to return the result, serialize the results for return, and
return the results of the executed operations to the processing engine proxy.

* * * * *